United States Patent
Perez, Jr. et al.

(10) Patent No.: US 9,818,072 B2
(45) Date of Patent: Nov. 14, 2017

(54) SYSTEMS AND METHODS FOR FACILITY OPTIMIZATION

(75) Inventors: Jorge Perez, Jr., Chantilly, VA (US); Hunter C. Bell, Jr., Haymarket, VA (US); Robert Graham Kerster, Arlington, VA (US); Thomas Michael Schach, Arlington, VA (US); Mark A. Young, Bristow, VA (US); Robert James McGrath, Poestenkill, NY (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 742 days.

(21) Appl. No.: 12/782,020

(22) Filed: May 18, 2010

(65) Prior Publication Data
US 2011/0288895 A1  Nov. 24, 2011

(51) Int. Cl.
*G06Q 10/06* (2012.01)
*G06Q 30/00* (2012.01)
*G06Q 50/16* (2012.01)

(52) U.S. Cl.
CPC ......... *G06Q 10/0631* (2013.01); *G06Q 10/06* (2013.01); *G06Q 10/067* (2013.01); *G06Q 30/018* (2013.01); *G06Q 50/163* (2013.01)

(58) Field of Classification Search
CPC .................................................. G06Q 10/06
USPC ........................................................ 705/7.12
See application file for complete search history.

(56) References Cited

U.S. PATENT DOCUMENTS

| | | | |
|---|---|---|---|
| 2002/0138353 A1* | 9/2002 | Schreiber .......... | G06F 17/30958 705/26.1 |
| 2004/0113937 A1* | 6/2004 | Sawdey et al. ............... | 345/738 |
| 2005/0086093 A1* | 4/2005 | Hammad et al. ................. | 705/8 |
| 2005/0288986 A1* | 12/2005 | Barts et al. ........................ | 705/9 |
| 2007/0173993 A1* | 7/2007 | Nielsen et al. ................. | 701/35 |
| 2008/0162242 A1* | 7/2008 | Schneur ................. | G06Q 10/06 705/7.14 |
| 2008/0183483 A1* | 7/2008 | Hart ................................. | 705/1 |
| 2009/0216438 A1* | 8/2009 | Shafer .................. | G01C 21/206 701/414 |
| 2010/0057562 A1* | 3/2010 | Gabbay ...................... | 705/14.52 |
| 2011/0029420 A1* | 2/2011 | Bianco et al. .................. | 705/32 |
| 2011/0178863 A1* | 7/2011 | Daigle ....................... | 705/14.31 |
| 2013/0021174 A1* | 1/2013 | Silzer et al. .................. | 340/989 |

* cited by examiner

*Primary Examiner* — Kurtis Gills
(74) *Attorney, Agent, or Firm* — Finnegan, Henderson, Farabow, Garrett & Dunner, LLP

(57) ABSTRACT

Systems and methods create a digital geospatial display of facilities to aid facility management. In one implementation, a system retrieves data for a plurality of facilities from various databases, including, but not limited to, map data for creating maps, location data for the facilities, and resource data for the facilities. The system marks the locations of the facilities on a map display using a facility icon. The facility icon comprises one or more resource status areas, each of which convey information about the state of a resource at a facility. The system calculates the resource status areas of the facility icons based at least on the resource data.

57 Claims, 19 Drawing Sheets

TAMPA - EHRLICH BRANCH
14910 N DALE MABRY HWY
TAMPA, FL 33618-1814

Area: Southeast FSO
District: Suncoast
Empl. Complement: 90

Finance/Sub: 118925 - 086
Leased/Owned: Leased

SUMMARY

|  | Existing | Calc Required Today | +/- | Calc Required Future | +/- |
|---|---|---|---|---|---|
| Retail SF | 3824 | 7818 | -3994 | 0 | 0 |
| Delivery Workroom SF | 6693 | 2091 | 4602 | 0 | 0 |
| Other Workroom SF | 0 | 0 | 0 | 0 | 0 |
| *Total Workroom SF* | 6693 | 2091 | 4602 | 0 | 0 |
| Parking Spaces | 0 | 75 | -75 | 0 | 0 |

RETAIL

|  | Existing SF | Calc Required Today SF | +/- | Calc Required Future SF | +/- |
|---|---|---|---|---|---|
| Counters |  | 1464 |  | 1464 |  |
| PO Boxes |  | 5700 |  | 5700 |  |
| Parcel Lockers |  | 297 |  | 297 |  |
| APC |  | 52 |  | 52 |  |
| Letter Drop |  | 8 |  | 8 |  |
| Total Retail | 3824 | 7818 | -3994 | 0 | 0 |

| | |
|---|---|
| Walk-In Revenue ($ Last Complete FY from EDW/RDDM) | 1887785 |
| Existing Service Counters (Cashwraps & Retail Service Counters from FDB) | |
| Earned WOS (Most Recent Mar/Oct EASG from EDW/RDM) | 4 |
| Wait Time in Line (from EDW/RDM) | |
| Alternate Access (% Revenue Last Complete FY from EDW/RDM) | 0 |
| APCs (Actual Installed from FDB) | 2 |
| APC Gain (% from EDW/RDM) | |
| Firm Callers (Actual from WebBATS) | 1 |

| Post Office Boxes (From WebBATS) | | | | |
|---|---|---|---|---|
|  | Existing | Rented | Wait list | Group E |
| POB # 1 | 588 | 559 | 1 | 0 |
| POB # 2 | 632 | 545 | 0 | 0 |
| POB # 3 | 318 | 164 | 0 | 0 |
| POB # 4 | 67 | 26 | 0 | 0 |
| POB # 5 | 9 | 2 | 0 | 0 |
| Total | 1614 | 1296 | 1 | 0 |

FIG. 6a

TAMPA - EHRLICH BRANCH  Area: Southeast FSO  Finance/Sub: 118925 - 086
14910 N DALE MABRY HWY  District: Suncoast  Leased/Owned: Leased
TAMPA, FL 33618-1814  Empl. Complement: 90

PARKING

| PARKING SPACES | Existing | | Calc Required Today | | Calc Required Future | |
|---|---|---|---|---|---|---|
| | Internal Spaces | External Spaces | Spaces | +/- | Spaces | +/- |
| Employee | | | 75 | | | |
| Delivery Vehicle | | | 15 | | | |
| Total Employee & Delivery Vehicle | 0 | 0 | 75 | -75 | 0 | 0 |
| Customer | 0 | 0 | 40 | | | |
| On or Off Site Joint Use | | 0 | | | | |
| Off Site Exclusive Use | | 0 | | | | |

DELIVERY & OTHER WORKROOM

| | Existing | Calc Required Today | | Calc Required Future | |
|---|---|---|---|---|---|
| | SF | SF | +/- | SF | +/- |
| CSBCS | | 0 | | 0 | |
| DBCS | | 0 | | 0 | |
| BMEU | | 0 | | 0 | |
| Other Workroom Total | 0 | 0 | 0 | 0 | 0 |
| Delivery Workroom | 6693 | 2091 | 4602 | 0 | 0 |
| Total Workroom | 6693 | 2091 | 4602 | 0 | 0 |

| | |
|---|---|
| CSBCS Count (From FDB) | 0 |
| DBCS Count (From FDB) | 0 |
| BMEU Transactions (Avg Daily from PostalOne) | 0 |

FIG. 6b

TAMPA - EHRLICH BRANCH  Area: Southeast FSO  Finance/Sub: 118925 - 086
14910 N DALE MABRY HWY  District: Suncoast  Leased/Owned: Leased
TAMPA, FL 33618-1814  Empl. Complement: 90

CARRIER ROUTES

| TODAY | | | | FSS Y/N | FUTURE | | | | |
|---|---|---|---|---|---|---|---|---|---|
| Zone | Routes | Motorized | PDs | | Routes | CACI | SEI | ST | PDs |
| 33825 | 17 | | | No | | 3.04% | | | |
| CR | 0 | | | | | | 0 | 0 | |
| RR | 15 | | | | | | | | |
| HCR | 2 | | | | | | | | |
| | | | | | | | | | |
| CR | | | | | | | | | |
| RR | | | | | | | | | |
| HCR | | | | | | | | | |

FIG. 6c

SYSTEMS AND METHODS FOR FACILITY OPTIMIZATION

FIELD

The disclosed subject matter relates to the field of facilities management and, more particularly, to methods and systems for identifying potential target facilities for optimization and for supplying an analysis of resource consolidation opportunities.

BACKGROUND

For any organization operating a large number of facilities, managing those resources requires large amounts of time and money. In order to boost profits, an organization may desire to evaluate the number of facilities it operates and seek to save money by optimizing facilities based on various criteria, such as which consolidations would have the smallest impact on customer service, minimize risk, or generate the largest return on investment. An organization may spend large amounts of time determining whether or not to close a facility and what to do with the movable resources currently used by the facility, such as staff and equipment. To accomplish this, planners typically rely on large tabular reports full of numbers, which are unintuitive, difficult, and time-consuming to analyze. Many times, despite many hours of analysis, the facility-consolidation decision may not properly reflect return on investment, net present value, human resource issues, or long-term cost considerations. Often, these decisions may occur simply because the organization can easily move resources and capacity from one facility to another, not because the move efficiently uses resources or capital. This results in the loss of potentially higher savings.

Another aspect of facility management is efficient maintenance. A facilities manager with authority over several facilities in an area must deal with maintenance issues, such as repairing a broken air conditioner or leaky plumbing, occurring at the facilities he manages. These maintenance issues are typically managed in a time-ordered queue, based on when a maintenance complaint is received, and are sometimes modified by a priority consideration. However, such reactionary management methods cause inefficiencies. For example, a facility manager may employ an HVAC company to correct an AC problem in facility A on one day, and then employ the same HVAC company again the next day to correct a problem at facility B, because the two problem reports were separate in the time-ordered queue. This is inefficient because the HVAC company could have performed both jobs on the same day, likely reducing travel expenses and service call charges.

Therefore, it is desirable to introduce tools to help organizations manage multiple facilities, including identifying candidate facilities for closure and making sound, timely, and justifiable decisions about which facilities to close. It is also desirable to create tools that organize facility maintenance tasks, including taking advantage of economies of scale by consolidating maintenance tasks and realizing other efficiencies among multiple maintenance tasks.

SUMMARY

Disclosed embodiments provide facility optimization systems and methods that may help identify facilities to target for closure, help identify facilities within a specific drive time or mileage range of the target facility that can absorb the resources of the terminated facility, and help analyze the impact of the move on the affected facilities' operations and employees. Disclosed embodiments may also identify and organize similar maintenance tasks at nearby facilities.

Consistent with disclosed embodiments, a method is provided for creating a digital geospatial display of facilities. The method includes receiving, from an electronic storage medium, data for a plurality of facilities. The data comprises map data, location data, and resource data. The method further includes receiving a selection of one or more of the plurality of facilities and creating information used to display a map showing a location of at least one selected facility. The location is marked using a facility icon comprising a resource status based at least on the resource data for the at least one selected facility.

Also consistent with disclosed embodiments, a system is provided for creating a digital geospatial display of facilities. The system includes a processor and a memory. The system further includes an electronic storage medium storing data for a plurality of facilities. The data comprises map data, location data, and resource data. The system further includes a display device showing a map of a location of at least one of the plurality of facilities. The location is marked using a facility icon comprising a resource status based at least on the resource data for the at least one of the plurality of facilities.

Consistent with other disclosed embodiments, a method is provided for reallocating resources by creating a digital geospatial display of a plurality of facilities. The method includes retrieving, from an electronic storage medium, identifiers of the plurality of facilities. The method further includes creating information used to display a map showing a location of a first facility of the plurality of facilities as a facility icon. The facility icon comprises a resource status based at least on a resource category. The method further includes receiving a reassignment of a re-locatable resource from the first facility to a second facility of the plurality of facilities.

Also consistent with disclosed embodiments, a system is provided for reallocating resources by creating a digital geospatial display of a plurality of facilities. The system includes a processor and a memory. The system further includes a display device showing a map indicating a location of a first facility of the plurality of facilities as a facility icon. The facility icon comprises a resource status based at least on a resource category. The processor reassigns a re-locatable resource from the first facility to a second facility of the plurality of facilities.

Consistent with other disclosed embodiments, computer-readable storage media may store program instructions that are executable by a processor to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the disclosed principles. In the drawings:

FIGS. 6a-6c are exemplary detail reports that may be available for candidate facilities, consistent with disclosed embodiments.

DESCRIPTION OF THE EMBODIMENTS

Figure 1:
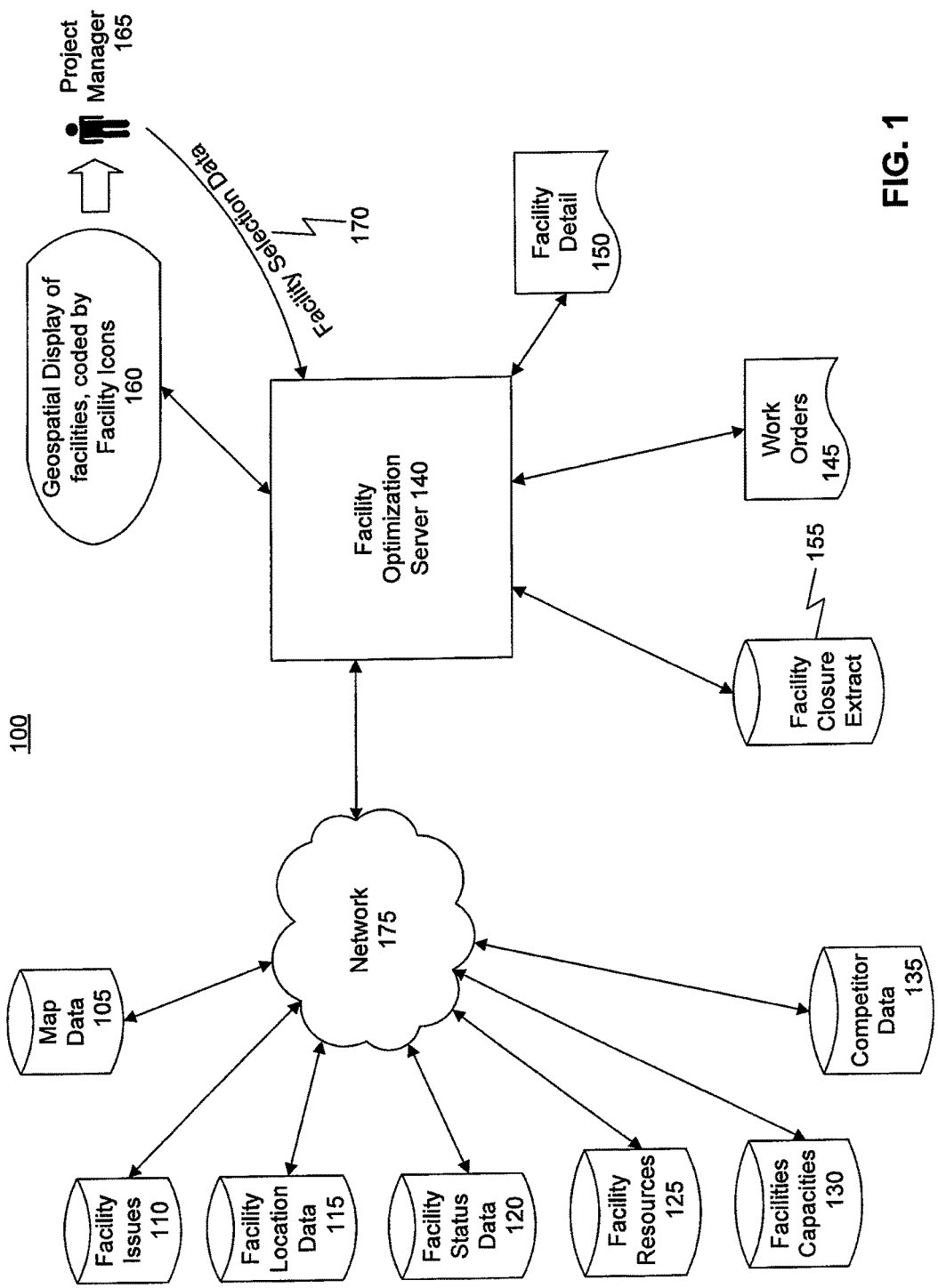
FIG. 1 is a diagram illustrating an exemplary system, consistent with disclosed embodiments.

Disclosed embodiments enable a facility manager to maximize space allotment and optimize resources, resulting in reduced costs and increased revenue. Maximizing space allotment includes identifying facilities that may be closed or leased, selling off or leasing properties where feasible, eliminating high dollar leases, and identifying underutilized space that can absorb the resources of the facility targeted for closure. Optimizing resources includes using economies of scale to decrease the time and money spent addressing the same type of issue at separate facilities in the same geographic area.

Disclosed embodiments take much of the guesswork out of a decision to close a facility by providing a means to make better and faster business decisions. Information used to make decisions is gathered from various sources and displayed through maps and interactive graphics that use spatial intelligence to combine the different dimensions of data and immediately focus planners, managers, and other users, on what is important. Interactive filters and controls allow these users to easily change the content and appearance of the visual displays as they are viewing them, thereby eliminating clutter. Drill-down features enable information to be displayed at many different levels of detail, and may be instantly changeable by the users. Also, because geographic location is an important factor in managing and optimizing facilities, the use of spatial intelligence tools and automated resource and capacity calculations enable users to rapidly perform "what if" scenarios that were previously impractical or impossible to do manually.

Disclosed embodiments display facilities utilized by the organization on a map that indicates their proximity to each other, their varied resource requirements and capacities, and other details important to a facility analysis. This helps users quickly identify potential target facilities for consolidation, such as facilities that are overcrowded, facilities that have available space, facilities meeting certain lease terms, underperforming facilities, or facilities facing a high degree of local competition. Once a facility is identified, users may determine where resources associated with the facility can relocate, should the facility close and the space be sold or leased. Embodiments may enable planners to decide where to move facility resources by allowing them to see the positive or negative consequences of moving resources from one facility to another. In this manner, the impact on facility resources and capacities, such as retail space, customer wait times, delivery routes, work room space, delivery drive times, and transportation costs, may be analyzed before making a decision to close a facility.

Disclosed embodiments also allow managers to view facilities under their authority with a common type of maintenance issue. This allows the managers to take advantage of the economies of scale by allowing them to offer a bundle of repair jobs at neighboring facilities to a vendor at one time.

Reference will now be made in detail to exemplary embodiments, examples of which are illustrated in the accompanying drawings. Wherever convenient, the same reference numbers will be used throughout the drawings to refer to the same or like parts.

FIG. 1 is a diagram of facility optimization system 100, including the resources used by system 100 and the products of system 100, consistent with disclosed embodiments. The resources represent the information a planner or other user may need to make rapid and highly accurate decisions regarding facility optimization. Facility optimization server 140 receives resource information, from sources such as databases 105 through 135, and transforms the received data into outputs, such as display 160, extract 155, or report 150. Project manager 165, or other users, may use the outputs in facility optimization analyses. Facility optimization server 140 may access the resource information over network 175, which may include a local area network (LAN), a wide area network (WAN) and/or other suitable connections. It is also contemplated that some embodiments of facility optimization server 140 may receive this information via an external connection such as a direct communication link.

In some embodiments, these resources may include information needed to render realistic maps, represented by map data 105. The map data may include traditional map elements, satellite images showing the actual terrain, or oblique imagery that allows a map to be drawn in three dimensions at street level. In some embodiments, the resources may also include facility issues 110, such as repair or maintenance requests related to electrical systems, mechanical systems, plumbing, painting, paving, roofing, security, equipment, building structure, HVAC, signage, lighting, drainage, flooring, fencing, elevators, parking lot, accessibility, gutters, fire alarms, landscaping, or transformers. This list of facility maintenance issues is exemplary and not intended to be exhaustive.

Embodiments may also generate or display data regarding the location of a facility. This may include not only address information, but also information used to create an oblique image of the facility, and is represented by facility location data 115. Facility status data 120, may also be used as a resource to indicate whether a facility is planned, under construction, active, terminated, or otherwise disposed of. Facility status data 120 may also include the type of facility (such as retail, delivery, administrative), the facility ownership (e.g., leased, owned), and lease information, including annual rent amount, among other facility data.

Embodiments may also include facility resource data 125 and facility capacity data 130. Facility resource data 125 may include, but is not limited to, the number of employees working at the facility, what types of jobs they perform, the number of customers served each month, the average customer wait time, the amount of sales each month, the number and types of vending machines at the facility, the number and types of vehicles parked at the facility, the amount of space required per employee, the number of delivery zones serviced by the facility, and the number of routes within those zones. Facility capacity data 130 may include, but is not limited to, the number of parking spaces available at the facility by type of vehicle, the retail square footage, the work space square footage, lot square footage, and the number of service windows or checkout lanes at the facility. In some embodiments, facility resource data 125 and facility capacity data 130 may also include projections of the resources and capacities needed in the future. As an example, this data may include the projected number of delivery routes needed, the expected customer traffic, or expected monthly sales in five years.

Disclosed embodiments may also include competitor data 135. Competitor data 135 may include the location data that enables facility optimization server 140 to present the location of competitors on a map, the income for the competitor in the prior year, or walk-in revenue at the competitor's location.

Once facility optimization server 140 has received the resource data, it may transform this data into different types of output suitable for relaying information to a person and/or to another system. For example, embodiments of facility optimization server 140 may generate one or more work orders 120 for a given day. Work orders 120 may be grouped by type so that one service provider is offered several jobs at neighboring facilities. Embodiments of facility optimization server 140 may also generate facility detail reports 150. Facility detail reports 150 may assist project managers 165 or other users in finding target facilities to close and in an analysis of the feasibility of closing or consolidating those facilities.

Facility optimization server 140 may produce facility closure extract 155. Facility closure extract 155 may include data on several facilities involved in a proposed facility closure, such as the facility being closed, the new location of the re-locatable resources currently used by that facility, and the impact the move may have on one or more destination facilities. Facility closure extract 155 may be a data file imported into a spreadsheet and used to calculate an NPV for the closure or, in other embodiments, facility closure extract 155 may be a printout used to prepare a report, presentation, or proposal for securing approval and authorization for a facility closure.

Facility optimization server 140 may also create geospatial display 160. Geospatial display 160 shows the location of facilities on a map using facility icons. Display 160 may incorporate one or more of mapping, facility, resource, and capacity data into a display that allows project manager 165, or other users, to identify facilities for possible consolidation, identify facilities within a variable drive time of a facility targeted for consolidation, identify facilities that can absorb the resources of the targeted facility, and identify facilities that may be candidates for a facility node study. In some embodiments, a closure study may allow project manager 165 to conduct a high level analysis of the impact on facility resources, such as space and delivery drive times, resulting from moving operations or resources from one facility to another. Facility optimization server 140 may also use facility selection data 170, which project manager 165 may enter, to change geospatial display 160. Once facility optimization server 140 receives facility selection data 170, facility optimization server 140 may use this data to change the appearance of geospatial display 160, as explained in more detail below with regard to FIGS. 3-11.

Figure 2:
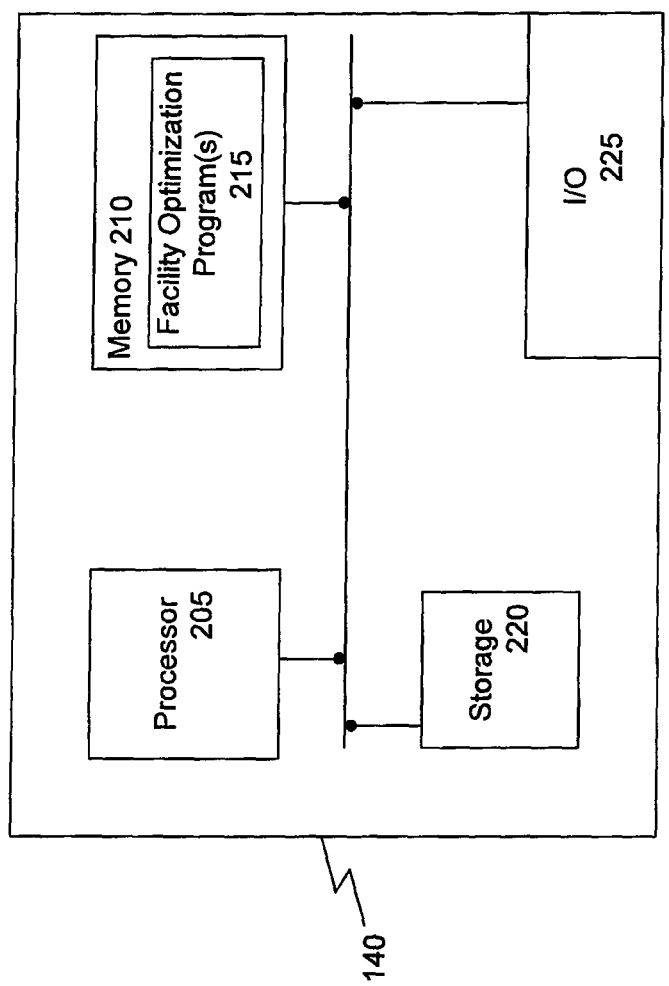
FIG. 2 is a diagram of an exemplary facility optimization server that may be used to implement disclosed embodiments.

FIG. 2 is a diagram of components included in facility optimization server 140, consistent with disclosed embodiments. The components and arrangement, however, may be varied.

Facility optimization server 140 may include a number of components, such as a processor 205, a memory 210, input/output (I/O) devices 225, and a nonvolatile storage device 220. Facility optimization server 140 may be implemented in various ways. Facility optimization server 140 may be a general purpose computer, a server, a mainframe computer, or any combination of these. Facility optimization server 140 may comprise processor 205, memory 210, nonvolatile storage 220, and I/O devices 225. Facility optimization server 140 may communicate over a link (not shown) with network 175. For example, the link may be a direct communication link, a LAN, a WAN, or other suitable connection, as described above. Facility optimization server 140 may be standalone or it may be part of a subsystem, which may, in turn, be part of a larger system, such as a legacy facility management system.

Processor 205 may be one or more known processing devices, such as a microprocessor from the Pentium™ family manufactured by Intel™ or the Turion™ family manufactured by AMD™. Memory 210 may be one or more storage devices configured to store information used by processor 205 to perform certain functions related to disclosed embodiments. Storage 220 may be a volatile or non-volatile, magnetic, semiconductor, tape, optical, removable, nonremovable, or other type of storage device or computer-readable medium. In one embodiment, memory 210 may include one or more facility optimization programs or subprograms 215 loaded from storage 220 or elsewhere that, when executed by facility optimization server 140, perform various procedures, operations, or processes consistent with disclosed embodiments. For example, memory 210 may include a facility data gathering program that gathers data from various sources, a facility mapping program that integrates the gathered data into a geospatial display and assists a user in identifying candidates for optimization, a facility optimization analysis tool that assists the user in determining the consequences of moving resources from one facility to one or more facilities, a facility maintenance program that assists a user in creating a list of facility problems or issues to address, and an integrative support program that links the other programs and allows them to use a common database, provides a common user interface, performs basic bookkeeping tasks, (such as storing the user's input, etc.), and provides user guidance and help. Memory 210 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 210 may be configured with a facility optimization program 215 that performs several functions when executed by processor 205. For example, memory 210 may include a single program 215 that performs the functions of the facility optimization system, or could comprise multiple programs. Moreover, processor 205 may execute one or more programs located remotely from facility optimization server 140. For example, facility optimization server 140 may access one or more remote programs that, when executed, perform functions related to disclosed embodiments.

Memory 210 may be also be configured with an operating system (not shown) that performs several functions well known in the art when executed by facility optimization server 140. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to any embodiment.

I/O devices 225 may comprise one or more input/output devices that allow data to be received and/or transmitted by facility optimization server 140. For example, I/O device 225 may include one or more input devices (not shown), such as a keyboard, touch screen, mouse, and the like, that enable facility optimization server 140 to receive data from a user, such as filter parameters, facility selection data, facility node study information, etc. Further, facility optimization server 140 may include I/O devices 225 that communicate with one or more output devices (not shown), such as a display screen, CRT monitor, LCD monitor, plasma display, printer, speaker devices, and the like, that enable facility optimization server 140 to present data to a user. I/O devices 225 may also include one or more digital and/or analog communication input/output devices that allow facility optimization server 140 to communicate with other machines and devices. Facility optimization server 140 may input data from external machines and devices and output data to external machines and devices via I/O devices 225. The configuration and number of input and/or output devices incorporated in I/O devices 225 may vary as appropriate for certain embodiments.

Facility optimization server 140 may also be communicatively connected to one or more additional databases (not shown) through network 175. The databases store information and are accessed and/or managed through facility optimization server 140. By way of example, the databases may be Oracle™ databases, Sybase™ databases, or other relational databases. The databases may include, for example, data and information related to maps, facility issues, facility locations, facility resources, facility capacities, etc. Systems and methods of disclosed embodiments, however, are not limited to separate databases or even to the use of a database.

Figure 3:
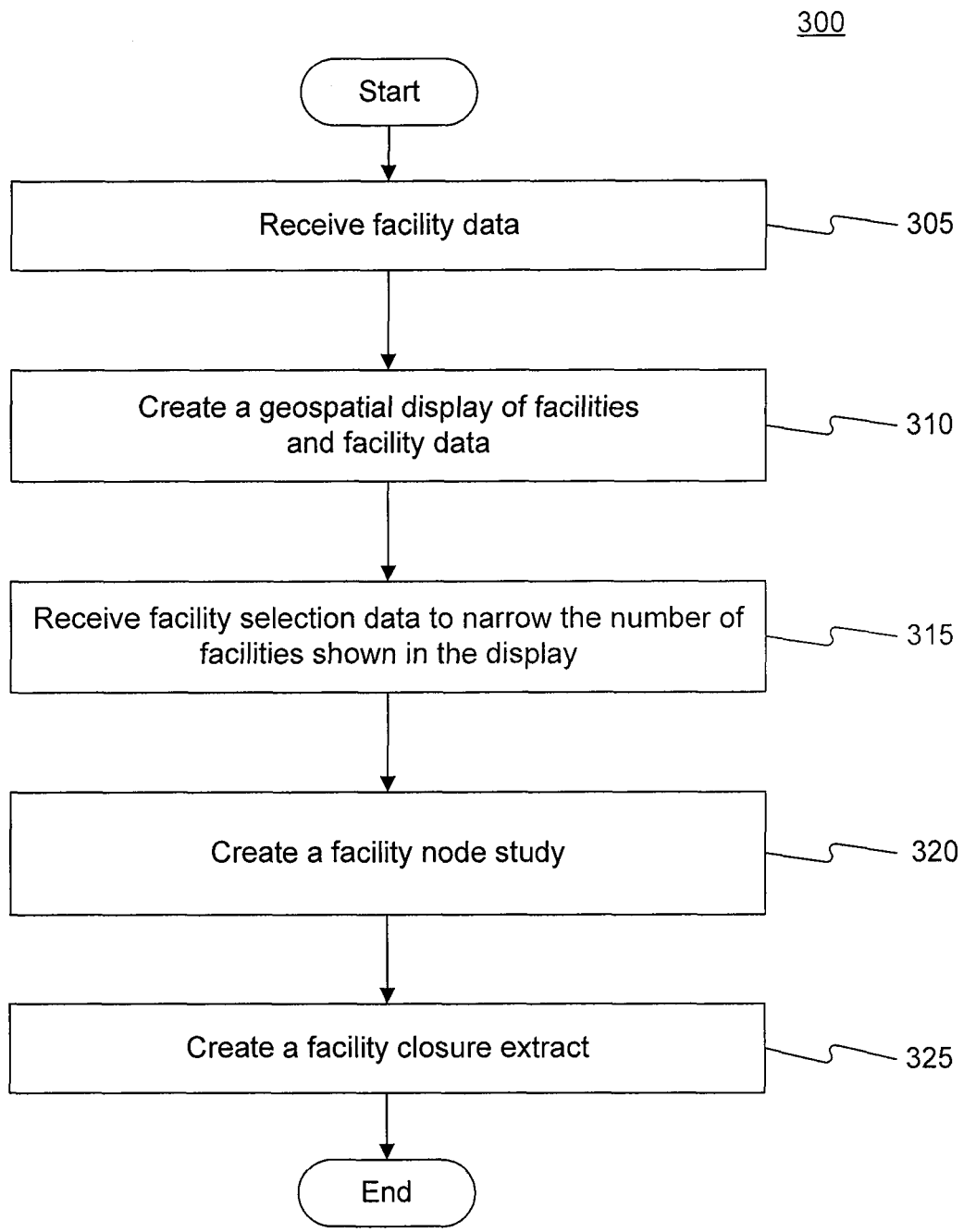
FIG. 3 is a flow diagram illustrating an exemplary facility optimization identification process, consistent with disclosed embodiments.

FIG. 3 is a flow diagram illustrating an exemplary facility optimization identification process 300, consistent with disclosed embodiments. In certain embodiments, process 300 may be implemented according to facility optimization program 215. In an embodiment implemented using facility optimization server 140, as shown in step 305 of FIG. 3, facility optimization server 140 may receive data related to facilities from various sources. These sources may be from databases communicatively connected via network 175, external storage, or entered from an input device. The data may include, but is not limited to, mapping data 105, facility issues 110, facility location data 115, facility status data 120, facility resource data 125, facility capacity data 130, or competitor data 135. Using the facility data, in step 310, facility optimization server 140 may create geospatial display of facilities 160. After creating the geospatial facility display, in step 315, facility optimization server 140 may receive facility selection data 170 and may use this data to further refine geospatial facility display 160. In step 320, facility optimization server 140 may create a facility node study that assists project manager 165 in creating a closed facility scenario. When the facility node study is complete, in step 325, facility optimization server 140 may create facility closure extract 155.

Figure 4:
FIG. 4 is an exemplary display that may be used with an initial selection process to determine candidate facilities, consistent with disclosed embodiments.

FIG. 4 is an exemplary display of the initial selection process for determining candidate facilities, consistent with disclosed embodiments. In some embodiments, selection box 405 may contain data fields used to narrow the facilities shown in geospatial display 160. For example, project manager 165, or some other user, may desire to see active retail facilities in the Tampa Fla. area having a delivery code, such as a zip code beginning with "336." Other fields not shown in FIG. 4 may be used to narrow the resulting facility display as appropriate. For example, project manager 165 may want to see active facilities with a monthly lease payment of $5,000 or more where the lease expires in the next 6 months. Facility optimization server 140 may then use the information in selection box 405 to find facilities matching the criteria and create information used to display those facilities on geospatial display 160. In other embodiments, facility optimization server 140 may prompt the user for responses to questions, such as the location of a facility, whether the user is looking to move into a space or move out of a space, and the maximum drive time or distance from a location the user will consider. Facility optimization server 140 may use the responses to determine which facilities match the responses and return those as matching facilities for geospatial display 160.

Figure 5:
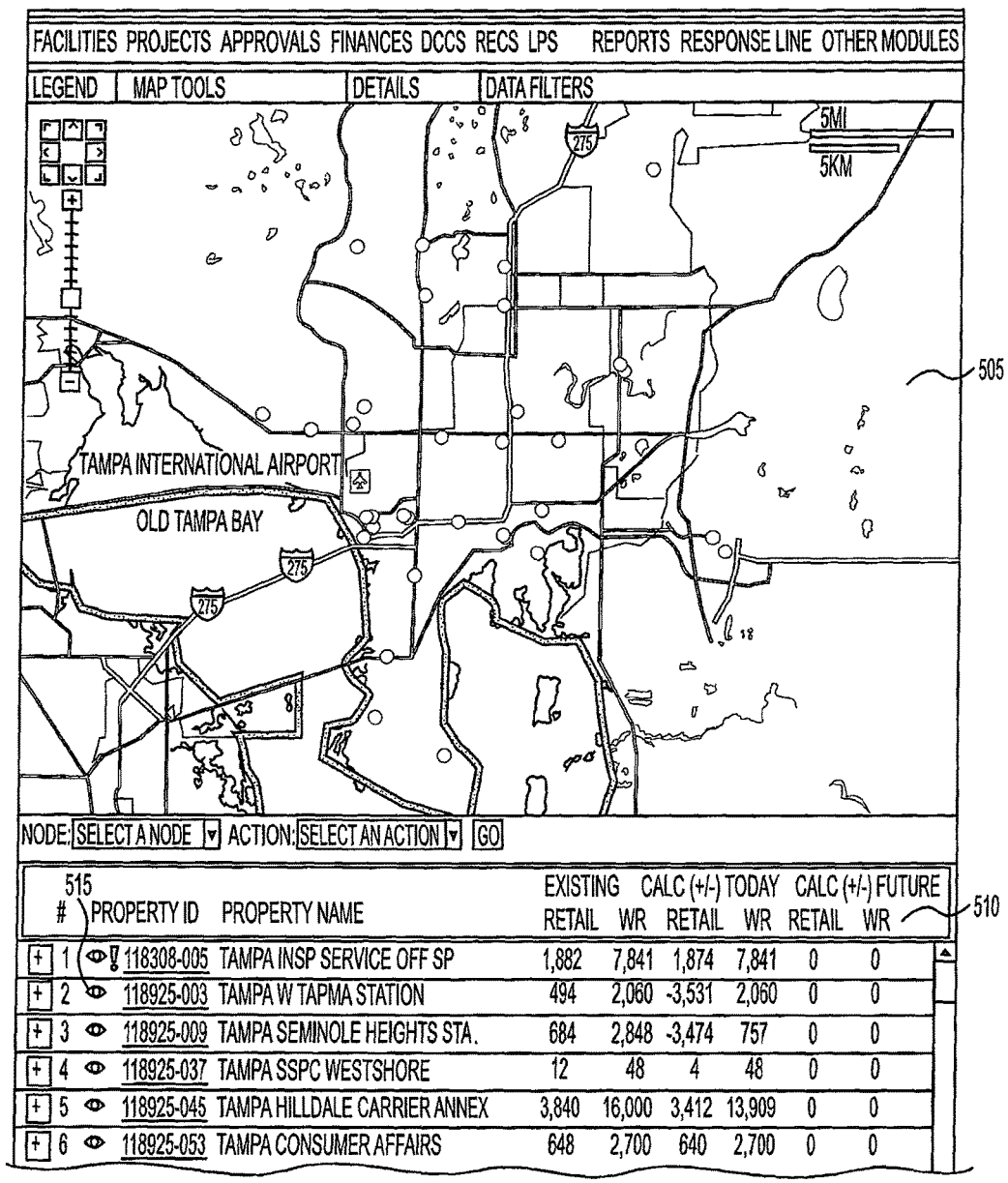
FIG. 5 is an exemplary display of matching facilities, consistent with disclosed embodiments.

FIG. 5 is an exemplary display of matching facilities created by facility optimization server 140, consistent with disclosed embodiments. The display, represented by FIG. 5, may represent geospatial display 160. Facility optimization server 140 may create map 505 to show the location of facilities matching selection criteria 405. Facility optimization server 140 may also create master list 510 to display details about each of the facilities shown on map 505, and may allow a user to further limit the facilities displayed in map 505. For example, clicking on icon 515 may cause facility optimization server 140 to hide the corresponding facility by removing it from map 505.

Figure 6:
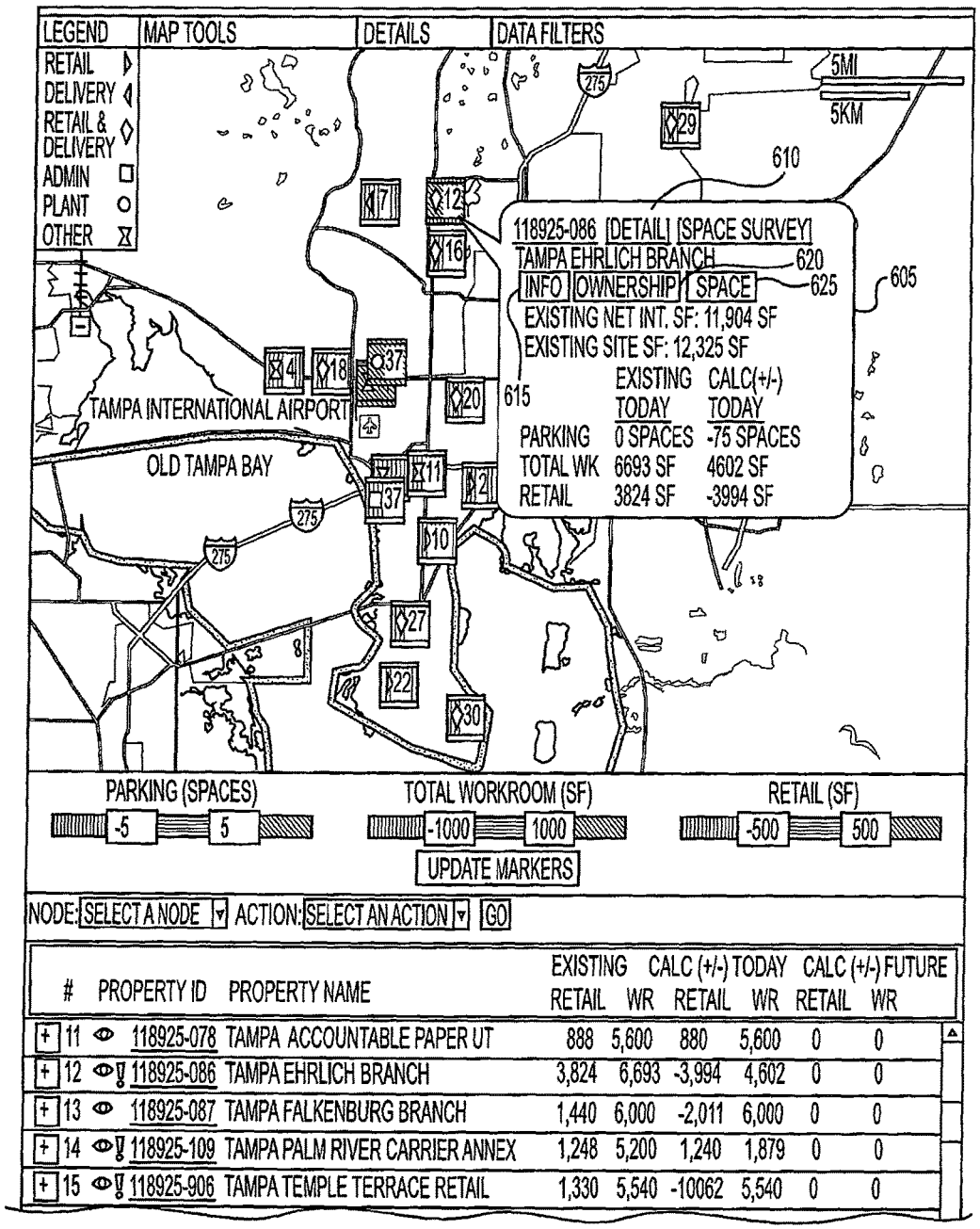
FIG. 6 is an exemplary display of facility details that may be available for candidate facilities, consistent with disclosed embodiments.

FIG. 6 is an exemplary display illustrating facility details available for candidate facilities, consistent with disclosed embodiments. Facility optimization server 140 may display detail window 605 in response to selection of a facility location on the map or a hyperlink for a facility in the master list. In some embodiments, facility optimization server 140 may change the detail displayed in detail window 605 in response to selection of detail view icons 615-625. For example, if ownership icon 620 is selected, facility optimization server 140 may display the facility ownership type, length of a lease, the amount of yearly rent, and the termination option for the lease in detail window 605. If space icon 625 is selected, facility optimization server 140 may display total existing square feet, existing retail square feet, existing workroom square feet, existing parking capacity, or a calculated value reflecting excess or deficient retail, workroom, and parking space. Facility optimization server 140 may display in detail window 605 any details collected about a facility that may assist a user in making decisions.

In some embodiments, additional reports may be made available from detail window 605. For example, when a user selects link 610, facility optimization server 140 may produce facility detail reports 150. Facility detail reports 150 may include any combination of the data collected on the facility in step 305.

FIGS. 6a-6c are exemplary facility detail reports available for facilities, consistent with disclosed embodiments. These detail reports may include facility resource data 125 and facility capacity data 130 not shown as part of master list 510 or detail window 605. For example, facility detail report 150 may show existing retail, delivery workroom, and other workroom square footage, as well as the number of parking spaces at the facility. The detail reports may also show a calculated desired value for each of these resources, as well as a projected future desired value. Facility detail reports 150 may also include information on the types of retail resources available at the facility, such as the number of counters, PO Boxes, lockers, letter drops, or kiosks. The optimal amount of square feet needed to support those resources may also be included in detail reports 150. Detail reports 150 may also show customer and sales information, such as revenue generated at the facility, the number of sales transactions, and the average wait time for the customers. Facility detail reports 150 may additionally include the data used to calculate the current need or desired value for resources, such as the number and type of parking spaces, customer traffic, the existing square footage of different areas of the workroom, and the number and type of employees. In other embodiments, facility detail reports 150 may also include competitor data 135 or facility status data 120.

Figure 7A:
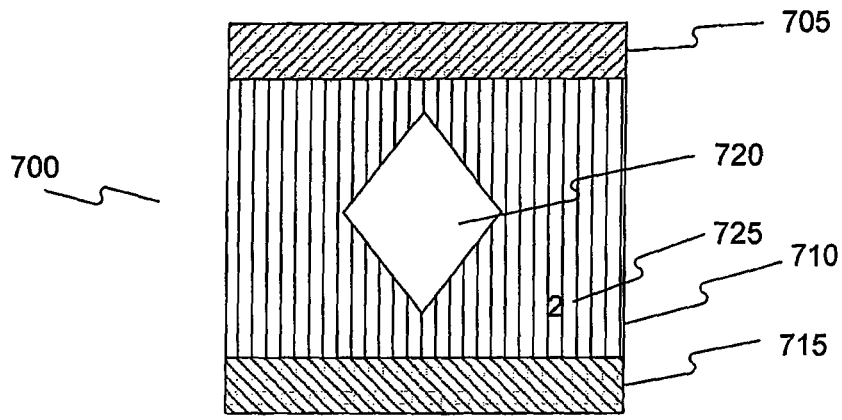
FIGS. 7a-7c are exemplary representations of a facility icon, consistent with disclosed embodiments.
Figure 7B:
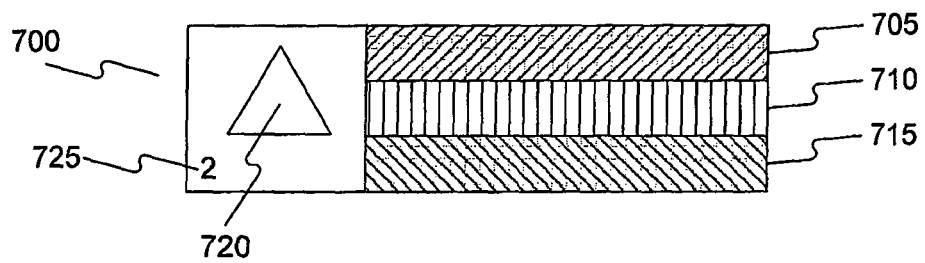
Figure 7C:
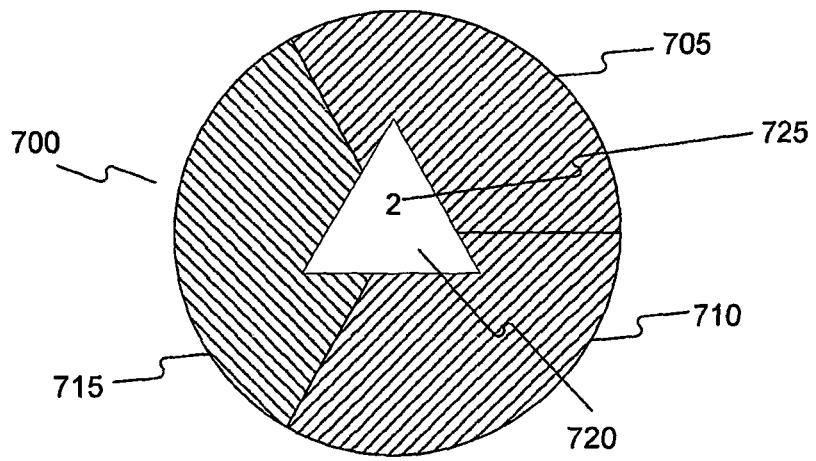

FIGS. 7a-7c are exemplary representations of facility icon 700, consistent with disclosed embodiments. Facility optimization server 140 may include facility icon 700 in geospatial map display 160 to convey more than just location information to a user. In some embodiments, areas 705-715 of facility icon 700 may represent a resource status for a resource category. A resource category may be a capacity availability of a facility resource, a ratio of sales dollars to employee salaries or a calculation of lease price per square foot. A resource category may represent resources available to or used at a facility, such as parking capacity, retail capacity, sales and rent amounts, equipment sets, processing capacity for delivery items or other products, or other facility statistics. As an example, area 705 may represent the current parking capacity availability, area 710 may represent the current workroom capacity availability, and area 715 may represent a value encompassing the current lease price per square foot. Thus, the resource categories in this example would be parking capacity, workroom capacity, and lease expense.

Areas 705-715 may be color-coded, shaded, or otherwise distinguished to indicate the resource status, such as whether the facility is deficient for the specified capacity, has adequate capacity, or has excess capacity. In other embodiments, a resource status may represent a sales to salary ratio and correspond to a ratio greater than 90%, between 80 and 90%, between 70 and 80% or less than 70%. Although FIGS. 7a-7c depict facility icon 700 divided into three areas, disclosed embodiments may contain fewer or more divisions.

In some embodiments, facility optimization server 140 may change the resource status represented in facility icon 700 from a measure of a current facility statistic to a measure of a projected future facility statistic. For example, instead of showing current retail space capacity, area 715 may represent a status based on the projected future retail space capacity needed. In other embodiments, facility optimization server 140 may change the appearance of facility icon 700 to indicate the facility is part of an active facility node study. For example, facility icon may include diagonal black lines through areas 705, 710, and 715. In other embodiments, facility optimization server 140 may color facility type symbol 720 red instead of black. This marking helps alert users that they should use caution when including that facility in their own facility node study so that they do not overlap with another facility node study. In addition, embodiments may contain facility type indicator 720 as part of facility icon 700. Facility type indicator 720 may be an icon incorporated into facility icon 700 or may be represented by the shape of the facility icon itself. Facility icon 700 may also contain identifier 725, which corresponds to a number in selected facility list 815 or master list 825, discussed in more detail below with regard to FIG. 8.

Figure 8:
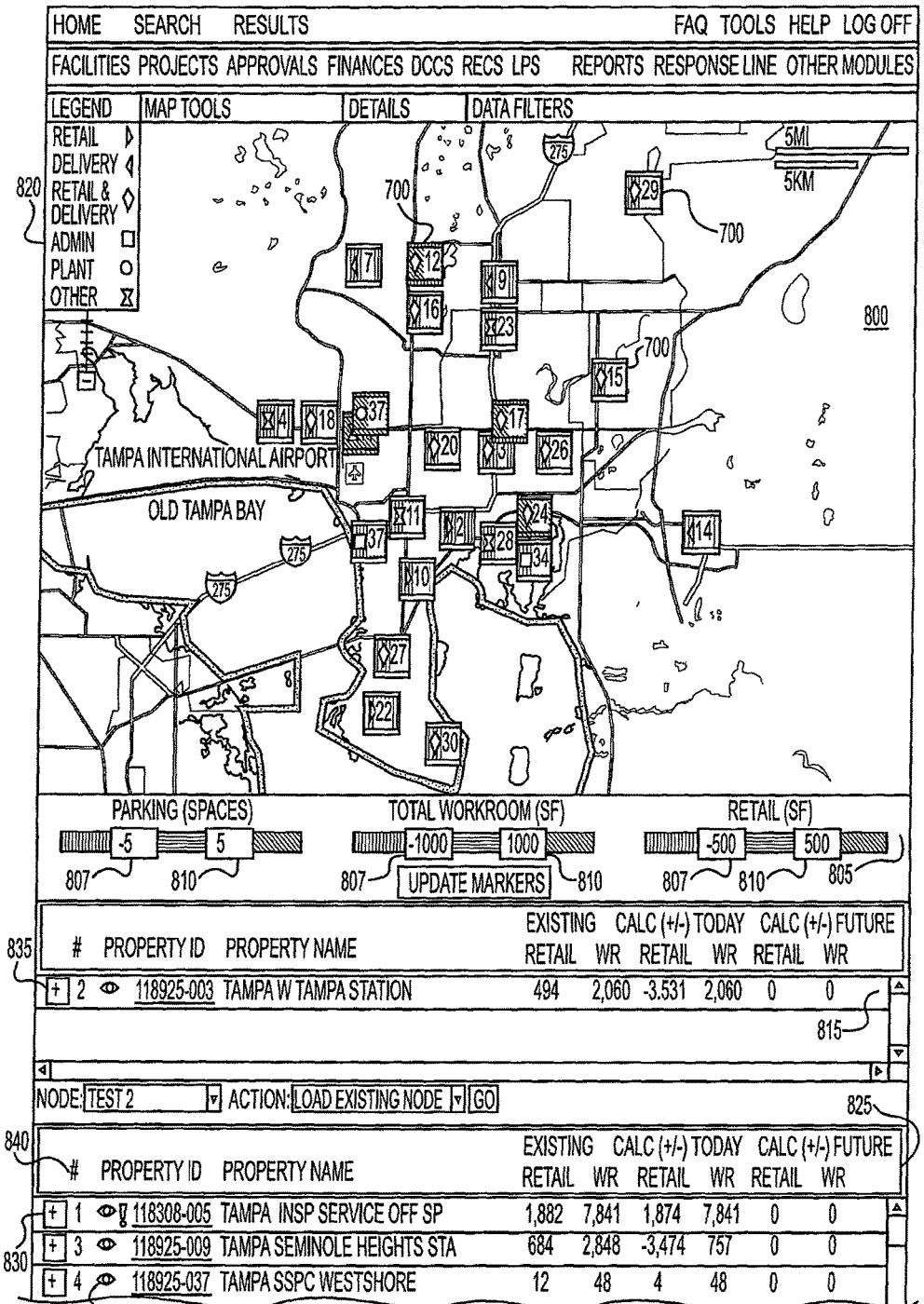
FIG. 8 is an exemplary geospatial display of candidate facilities and icons, consistent with disclosed embodiments.

FIG. 8 is an exemplary geospatial display of candidate facilities and their icons, consistent with disclosed embodiments. The display represented by FIG. 8 may represent geospatial display 160. Facility optimization server 140 may create map area 800 to display the location of each facility, as indicated by the placement of facility icon 700 on the map. Legend 820, which may be hidden from view, defines the facility type indicator 720 used in each facility icon 700. Some embodiments may contain resource status range section 805. The range delimiters in section 805 allow a user to communicate to facility optimization server 140 a change in the delimiters, such as upper limit 810 and lower limit 807, used to determine the resource status at a facility. For example, a resource status may represent excess capacity, adequate capacity, or deficient capacity. When facility optimization server 140 first creates the geospatial display of FIG. 8, it may use pre-determined values for upper limit 810 and lower limit 807. A user may adjust these pre-determined range delimiter values by entering in a new lower limit 807, a new upper limit 810, or both, for each resource category. After receiving new limits, facility optimization server 140 may re-calculate the resource status at each facility and modify resource status areas 705-715 of facility icons 700 on map 800, accordingly. In some embodiments, section 805 may contain a means, such as a radio button, a checkbox, or a toggle switch, that may tell facility optimization server 140 to base the resource status on a future facility statistic rather than a current facility statistic.

Disclosed embodiments may contain selected facility list 815 and master list 825. Facilities listed in selected facility list 815 are available for further analysis, such as a facility node study, described in more detail below. Facility optimization server 140 may remove a facility from selected facility list 815 and send it back to master list 825 in response to selection of icon 835, while facility optimization server 140 may add a facility to selected facility list 815 from master list 825 in response to selection of icon 830. Master list 825 and selected facility list 815 may each contain facility identifier 840, which corresponds to identifier 725 in facility icon 700. This enables the facility icon on map 800 to be matched with the facility detail data listed in either master list 825 or selected facility list 815. In addition, as discussed earlier in regard to FIG. 5, facility optimization server 140 may hide a facility from map display 800 in response to selection icon 515.

Master list 825 and selected facility list 815 may also contain some detail data on each facility. The detail data may represent resource categories. For example, each row of the list may contain the number of employees, the parking, retail square footage, stock room square footage, workroom square footage, lease price per square foot, annual or monthly sales transactions or amounts, etc. In preferred embodiments, facility optimization server 140 may display details that help focus a user on information needed to further select facilities, either for closure or to absorb the resources of a facility targeted for closure.

Figure 9:
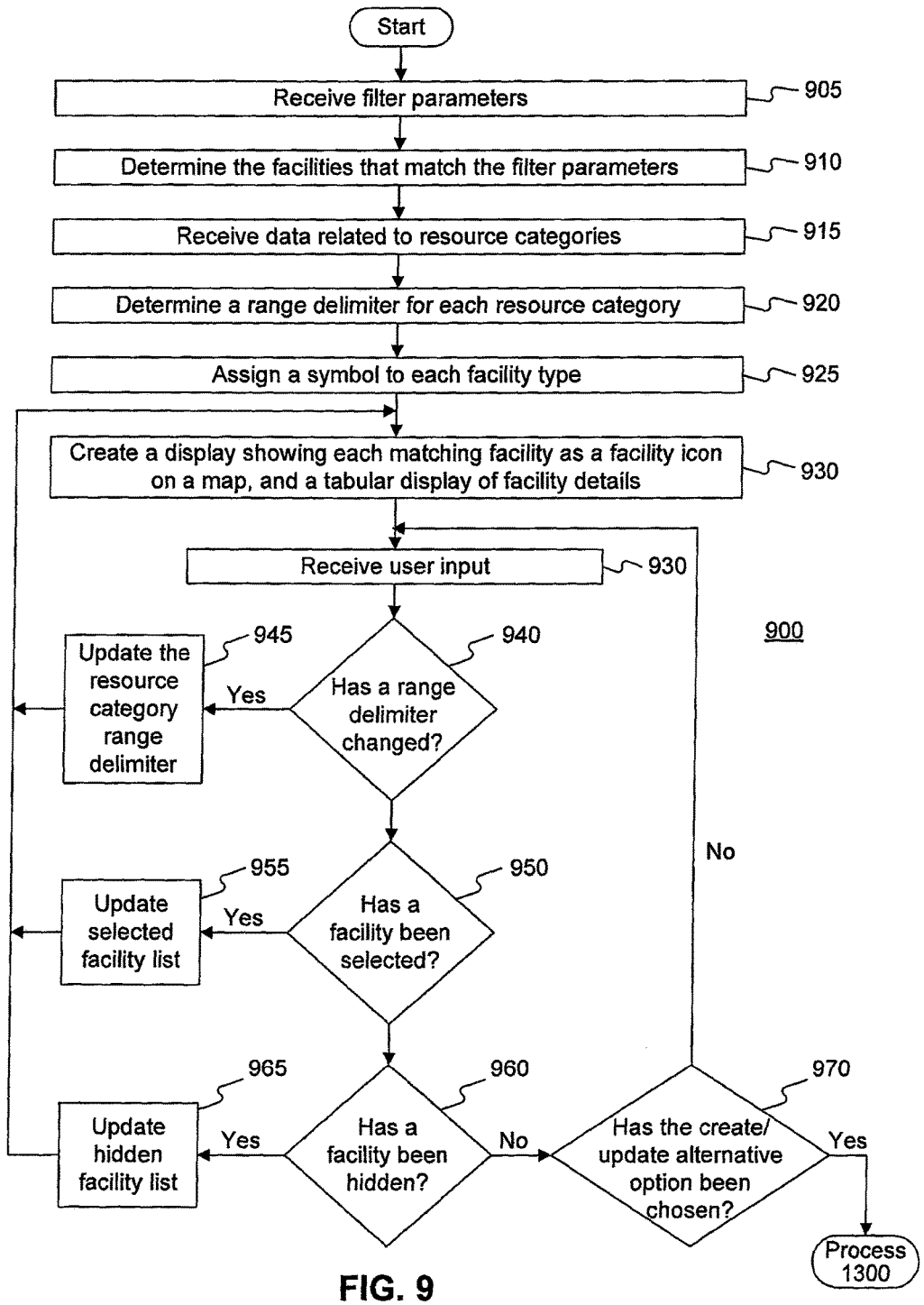
FIG. 9 is a flow diagram illustrating an exemplary facility identification process, consistent with disclosed embodiments.

FIG. 9 is a flow diagram illustrating an exemplary facility identification process, consistent with disclosed embodiments. In some embodiments, this process may be implemented according to facility optimization program 215. In an embodiment implemented using facility optimization server 140, as shown in FIG. 9, at step 905, facility optimization server 140 may receive facility filter parameters. These parameters may be similar to those shown in selection box 405 of FIG. 4, but may also include other parameters not shown in selection box 405. In step 910, facility optimization server 140 may determine which facilities match the filter parameters using the data gathered about each facility, as explained above in regard to step 305 of FIG. 3. In some embodiments, facility optimization server 140 may return competitor facilities that match the filter parameters.

Next, in step 915, facility optimization server 140 may receive information from database 125 and 130 relating to the resource categories, represented by resource status areas 705-715 of facility icon 700, for a facility that matches the filter parameters. In one embodiment, these resource categories may represent the number of parking spaces, the retail square footage, and the work room square footage. Other facility statistics, such as warehouse square footage, number of check-out registers, number of delivery bays, or the ratio of sales amounts to employee salary etc., may be resource categories consistent with disclosed embodiments. In step 920, facility optimization server 140 may determine a range delimiter for each resource category, for example, by reading the defaults from a database or memory 210. In step 925 facility optimization server 140 may assign a symbol to each type of facility. Embodiments may use the symbols shown in legend 820, although the use of other symbols is contemplated.

Next, in step 930, facility optimization server 140 may create a facility icon 700 for each facility that meets the filter parameters and creates a geospatial display of the facilities, such as the display shown in FIG. 8. In some embodiments, facility optimization server 140 may include competitor locations in the geospatial display. In some embodiments, the display may also include a tabular display of additional details about the facilities on the map, such as master list 825. Embodiments may also include competitor details in the tabular display, either integrated with the facility detail data in master list 825, selected facility list 815, or in a separate display area. The processes described in steps 905 through 930 are an example of the creation of a geospatial display described in step 310 of FIG. 3.

After creating a display, in step 935, facility optimization server 140 may receive further input from the user. If the user changes one or more of the resource category range delimiters (step 940, Yes), for example, by changing lower limit 807, in step 945, facility optimization server 140 may update the range delimiter of the resource category. Facility optimization server 140 may store the range delimiters in storage 220 or memory 210. After updating the range delimiters, facility optimization server 140 may return to step 930, described above, recalculating the resource status at each facility in accordance with the new range delimiters. If the user selects a facility (step 950, Yes) facility optimization server 140 may update the selected facility list in step 955, or if a user chooses to hide a facility (step 960, Yes), it may update the hidden facility list in step 965. In some embodiments, the selected facility list and the hidden facility list may be located in storage 220 or memory 210. When facility optimization server 140 updates the appropriate list it may return to step 930, described above. If the user chooses to create or update an alternative, facility optimization server 140 may proceed to process 1300, described in more detail below with respect to FIG. 13. Facility optimization server 140 may also base the resource status of facility icon 700 on a future facility statistic, rather than a current facility statistic.

Figure 10:
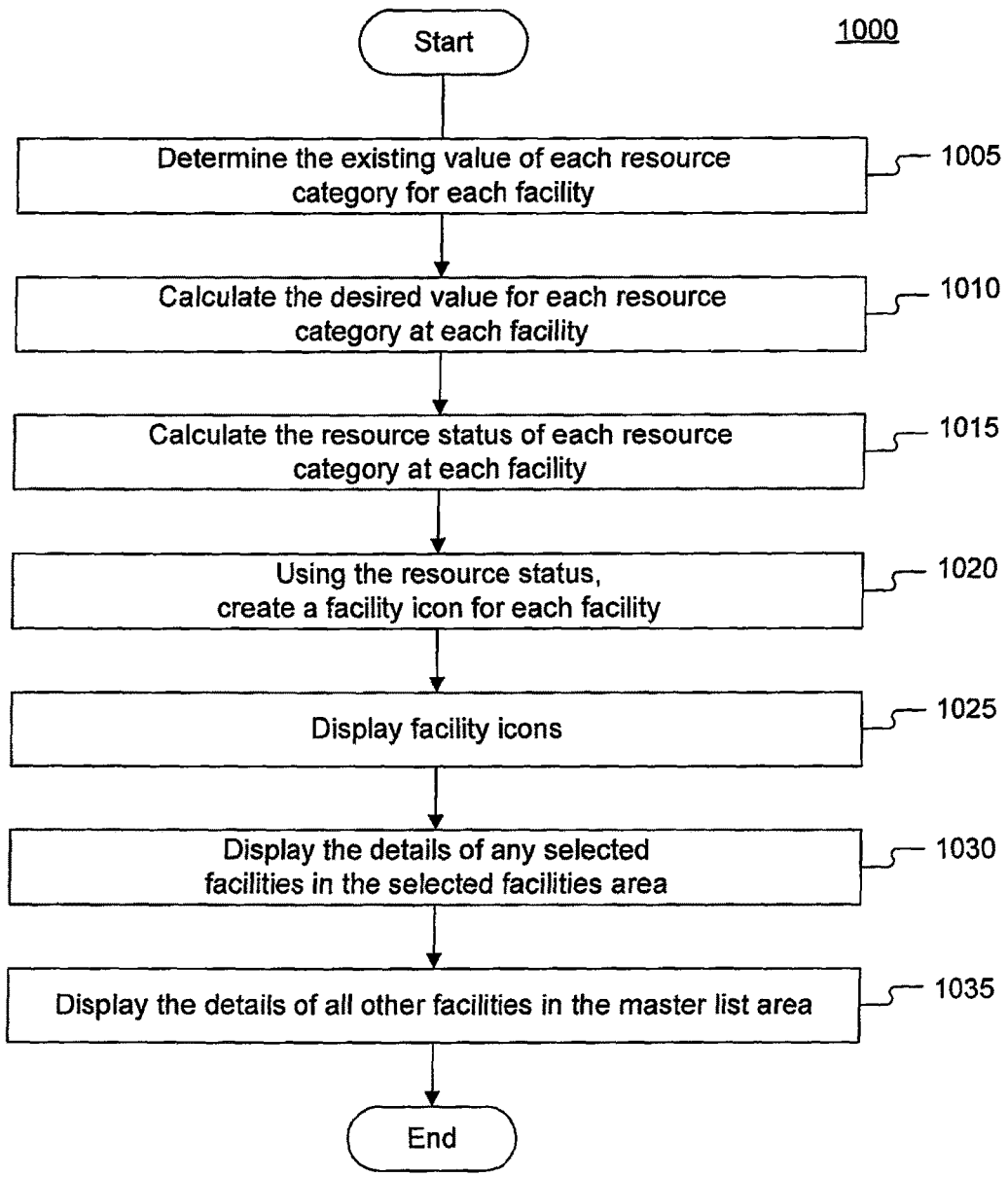
FIG. 10 is a flow diagram illustrating an exemplary process to create a geospatial display of candidate facilities and icons, consistent with disclosed embodiments.

FIG. 10 is a flow diagram illustrating an exemplary process to create a geospatial display of candidate facilities and icons, consistent with disclosed embodiments. In some embodiments, this process may be implemented according to facility optimization program 215. In an embodiment implemented using facility optimization server 140, as shown in FIG. 10, in step 1005 facility optimization server 140 may determine the value of each resource category represented by resource status areas 705, 710, and 715 for each facility. As an example, if one resource category is the retail space, facility optimization server 140 may read the value directly from facility resource data 125, or it may calculate the value based on measurements contained in facility resource data 125. Next, in step 1010, facility optimization server 140 may calculate the desired value for each resource category at each facility. The desired value may be based upon an optimum amount of space per employee, an optimum amount of space per retail customer, an optimum amount of space for the number of products stored per week, or some other equation representing an optimum level for a facility resource.

For example, an optimum amount of workroom space may be calculated by adding the number of square feet needed for each delivery route housed at the facility, the number of square feet required by each machine at the facility, and the number of square feet required based on the average number of transactions a facility handles in a day. This calculation is given as an example as disclosed embodiments are not limited to a particular calculation. Disclosed embodiments may encompass any calculation that properly determines the optimal value for a facility resource. In some embodiments, facility optimization server 140 may also calculate the future desired value for each resource category at each facility. Calculating the future desired value may also be accomplished by calculations that properly determine an optimal projected value for a facility resource.

In step 1015, facility optimization server 140 may calculate the resource status of each resource category at each facility, as described in more detail below with respect to FIG. 11. In some embodiments, these status values may be "deficient," "adequate," and "excess." The status values may also represent a range of values, such as greater than 90%, between 90% and 70%, and less than 70%. Next, facility optimization server 140 may use the resource status and the facility type symbol to create facility icon 700 for each facility in step 1020, as explained in more detail below in regard to FIG. 11. In step 1025, facility optimization server 140 may place these facility icons on a map, corresponding to their physical location. Any of the known methods for determining the location of an address on a map may be used to accomplish this step, and may result in a display similar to map 800 shown in FIG. 8. Facility optimization server 140 may hide the facility icon for any facility on the hidden facility list. In step 1030, facility optimization server 140 may gather details regarding facilities to place on the selected facilities list and create a tabular display of the details in the selected facilities area. This area may be similar to selected facilities area 815 of FIG. 8. Finally, in step 1035, facility optimization server 140 may gather details regarding other facilities and create a tabular display of those details in the master list area. The facility details may resemble those shown in master list 825 of FIG. 8, or they may include additional details not shown as part of that list. The processes described in FIG. 10 are an example of the creation of a display showing matching facilities as a facility icon on a map and a tabular display of facility details described in step 930 of FIG. 9.

Figure 11:
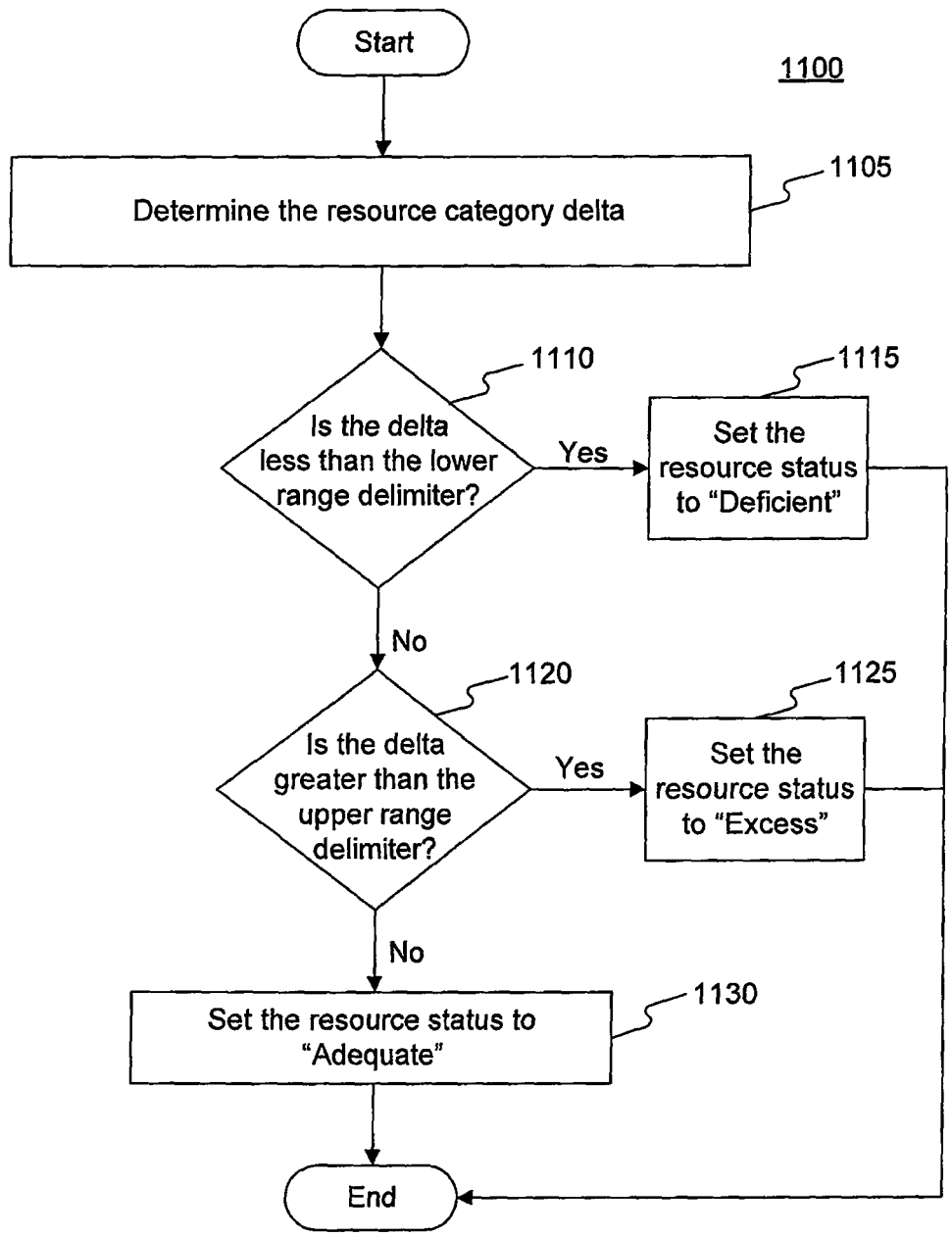
FIG. 11 is a flow diagram illustrating a resource status determination process, consistent with disclosed embodiments.

FIG. 11 is a flow diagram illustrating a resource status determination process, consistent with disclosed embodiments. In some embodiments, this process may be implemented according to facility optimization program 215. As shown in FIG. 11 step 1105, facility optimization server 140 may calculate the difference between the existing value of a resource category and the desired value for that resource category by subtracting the desired value from the existing value. Next, facility optimization server 140 may compare the difference to the lower range delimiter for that resource category. If the difference is less than the lower range delimiter (Step 1110, Yes) then the resource status for that facility is deficient, and facility optimization server 140 may mark the area of the facility icon that corresponds to that resource category as "deficient" using the corresponding color, shading, or other marking. In some embodiments, this may mean that this area is colored red. If the difference is greater than the upper range delimiter (step 1120, Yes) then the facility has excess capacity for that resource category, and facility optimization server 140 may mark the area of the facility icon corresponding to the resource category as "excess" using the corresponding color, shading, or other marking. In some embodiments, this may mean that the area is colored green. Finally, if the difference does not qualify as "deficient" or "excess," facility optimization server 140 may mark the area of the facility icon corresponding to that resource category as "adequate". In some embodiments, this may mean that this area is colored blue, although other colors, shading, patterns, or other markings may be selected. The color, shading, pattern, or other marking selected to represent the resource status (deficient, adequate, excess) is not important, so long as the markings convey to the user what the status is. The process represented by steps 1105 to 1130 is an example of calculating the resource status for each resource category at each facility, described in step 1015 of FIG. 10.

An example of the creation of facility icon 700 follows. A facility icon may consist of three divided areas, as shown in FIG. 7a, each representing the resource status of a resource category. Top area 705 may represent parking spaces, middle area 710 may represent workroom square footage, and bottom area 715 may represent retail square footage at a facility. If a particular facility has deficient parking, but adequate workroom and retail square footage, the icon may have area 705 colored red and areas 710 and 715 colored blue. If another facility has excess parking, deficient workroom square footage, and excess retail square footage the facility icon for that area may have areas 705 and 715 colored green and area 710 colored red. As a user changes resource category range delimiters, such as lower limit 807 and upper limit 810, facility optimization server 140 may change the resource status for a particular facility accordingly. Thus, if a facility has 5 parking spaces and a desired value of 7, a lower range delimiter of "−5" may cause the parking status to be "adequate," and thus facility optimization server 140 may display area 705 as blue. However, in response to a change of lower limit 807 to zero, facility optimization server 140 may determine the parking status has become "deficient" and accordingly display area 705 as red.

An example of the operation of facility optimization system 100 follows. A project manager for the Southeastern division of an organization may desire to eliminate a facility in the Tampa Bay, Fla. area. The project manager may use selection box 405 to tell facility optimization server 140 to display only active facilities in the Tampa area. After retrieving the appropriate data, facility optimization server 140 may select only those facilities matching that criteria, and then may create geospatial display 160, similar to that shown in FIGS. 5 and 8. The project manager may decide that he cannot close administrative facilities, and may tell facility optimization server 140 to hide the administrative facilities by selecting icon 515 for those facilities with facility type icon 720 representing administrative offices. In response to the selection of icon 515, facility optimization server 140 may remove corresponding facility icon 700 from the map display for each icon 515 that the project manager selects.

With the administrative facilities removed, the project manager or facility optimization server 140 can quickly determine where clusters of facilities are and target closing a facility in those clusters. In addition, the project manager may use the resource status areas of the facility icons to focus on facilities. The project manager may want to close a facility with excess space that is near another facility. The facility icon 700 of geospatial display 160 easily conveys this information. For example, facility optimization server 140 may display workroom excess space as a facility icon with green in middle area 710 of facility icon 700. In response to project manager 165 changing upper limit 810 of the workroom square footage to 7000, facility optimization server 140 may modify the appearance of the facility icons accordingly, re-creating geospatial display 160. The resulting display may easily convey information regarding which facilities have the most excess workroom space and their proximity to other facilities.

In response to the project manager selecting icon 830 for a facility, facility optimization server 140 may place the facility on selected facilities list 815. The resource status areas in facility icon 700, created by facility optimization server 140, may assist the project manager in selecting neighboring facilities of the facility on selected facilities list 815. The project manager may wish to exclude any crowded facilities from a possible pool of facilities able to absorb the resources of the closed facility. In response to adjustment of lower limit 807 of any of the resource category range delimiters, facility optimization server 140 may modify the appearance of the facility icons accordingly, and re-create geospatial display 160. Facility optimization server 140 may then hide facilities that could not absorb resources in response to the selection of icon 515. Facility optimization server 140 may place additional facilities on selected facilities list 815 in response to selection of icon 830 for facilities that could absorb resources. Facility optimization server 140 may then create a facility node study from the facilities on selected facilities list 815.

Figure 12:
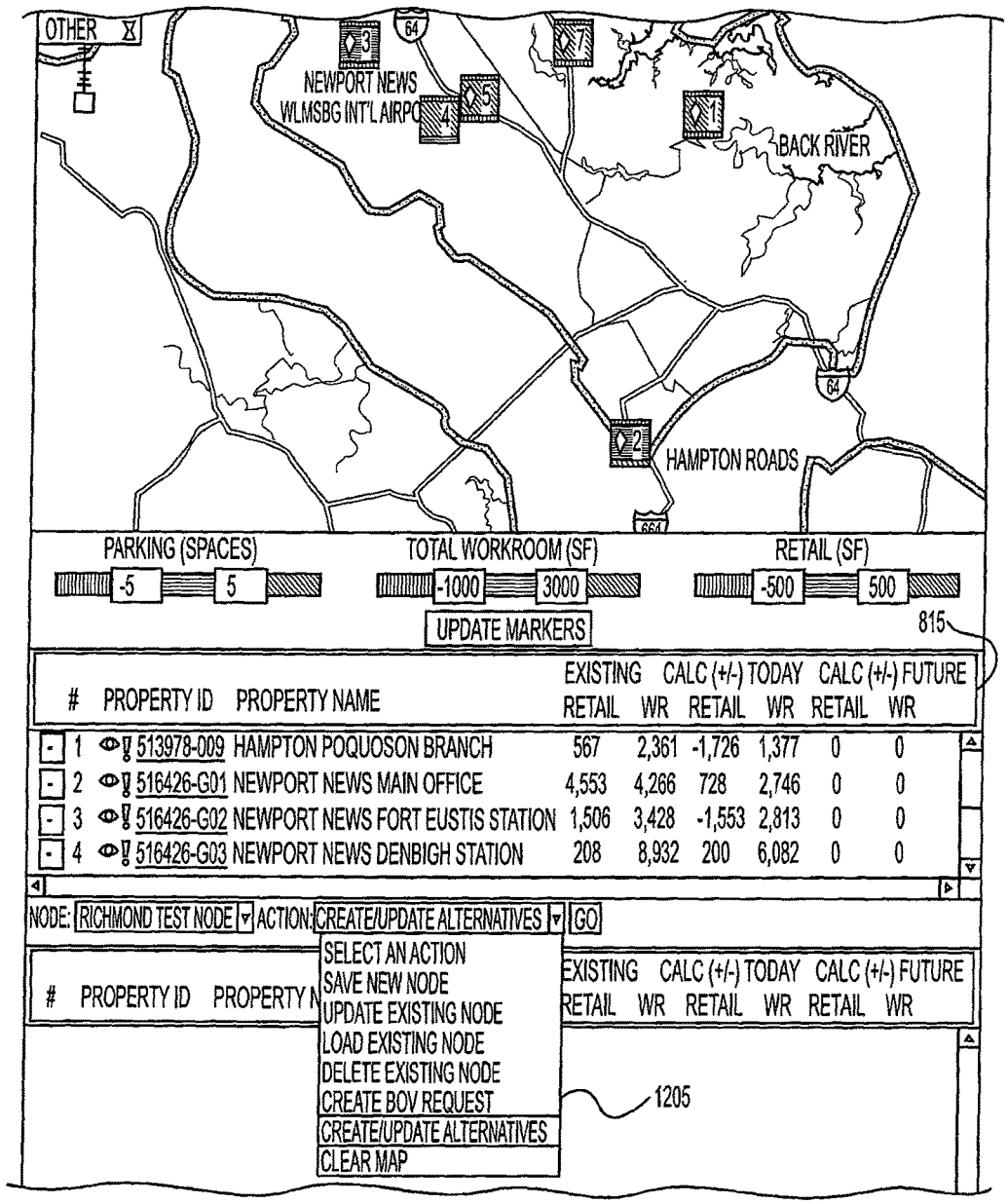
FIG. 12 is an exemplary display of options for creating or updating a facility node study, consistent with disclosed embodiments.

FIG. 12 is an exemplary display illustrating options for creating or updating a facility node study, consistent with disclosed embodiments. With one or more facilities placed in selected facility area 815, facility optimization server 140 may create an alternative, also known as a facility node study, using the selected facilities. Selection box 1205 shows an example of a means for users to indicate facility optimization server 140 should create an alternative study. Additionally, users may use selection box 1205 to indicate facility optimization server 140 should retrieve an existing alternative study.

Figure 13:
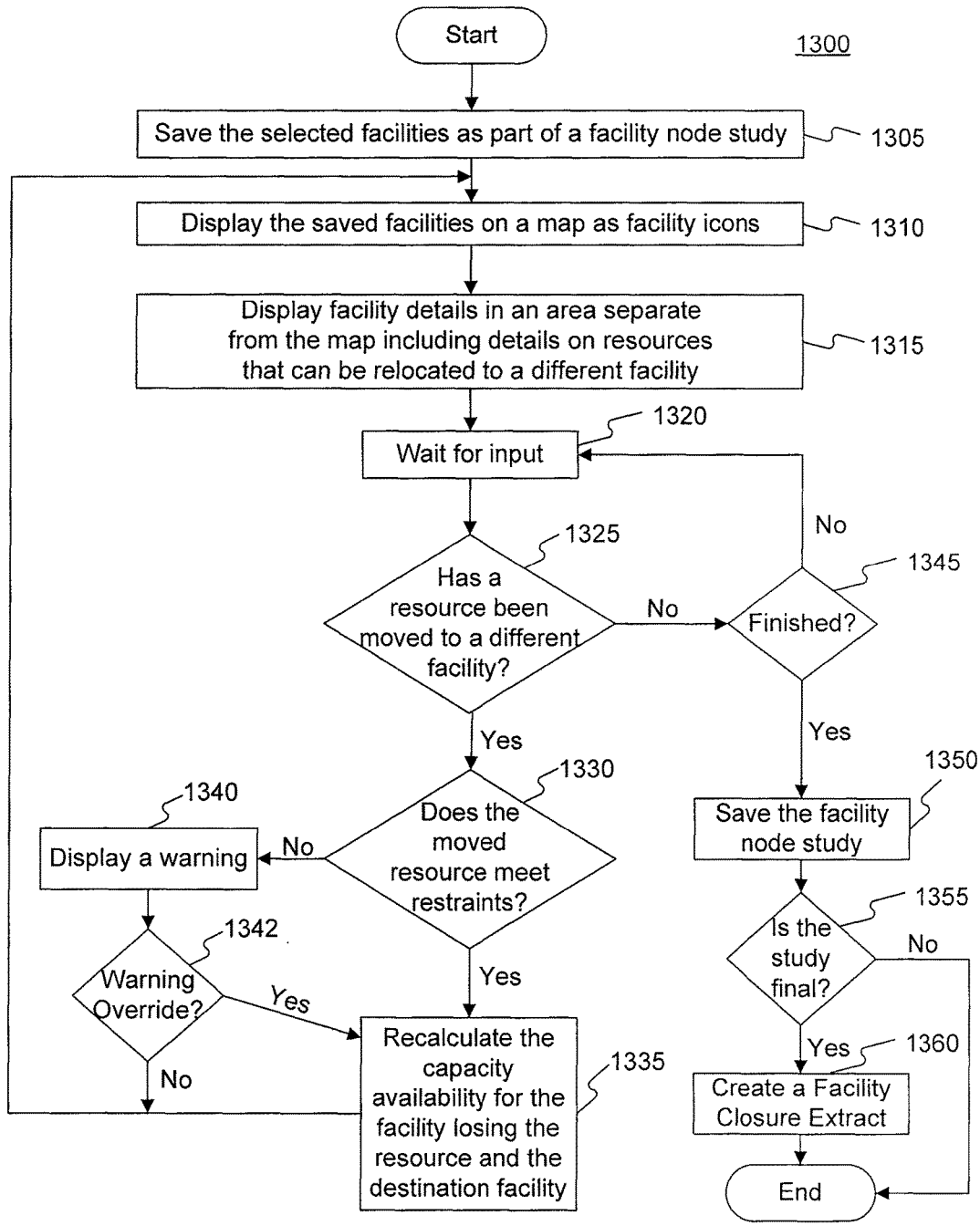
FIG. 13 is a flow diagram illustrating an exemplary facility node study process, consistent with disclosed embodiments.

FIG. 13 is a flow diagram illustrating an exemplary facility node study process, consistent with disclosed embodiments. In certain embodiments, this process may be implemented according to facility optimization program 215. In an embodiment implemented using facility optimization server 140, as shown in FIG. 13, in step 1305, facility optimization server 140 saves the selected facilities as part of a facility node study, also known as an alternative study. Facility optimization server 140 may save this study in storage 220, external storage, and/or in external databases accessed through network 175. Next, in step 1310, facility optimization server 140 may create a geospatial display of the saved facilities using map data 105, facility location data 115, facility resource data 125, and facility capacity data 130. The saved facilities may appear as facility icons 700 on the map. In step 1315, facility optimization server 140 may also create a display of facility details in an area separate from the map. The details may include resources that can be relocated to another facility and the capacities or other statistics that are affected by moving these resources.

For example, in some embodiments a delivery zone containing one or more delivery routes may appear as a facility detail that can be relocated to a different facility. When a delivery zone moves from one facility to another, the parking and workroom space at the new facility may be impacted, so facility optimization server 140 may also display details concerning these capacities. In other embodiments, batches of items to be processed, such as delivery items, currently processed at one facility may be moved to a different facility. Some batches may be moved to a first facility and others may be moved to a second facility. The move of these batches may impact the flow of the items through the system at the first and second facilities, as well as input and output procedures. Facility optimization server 140 may display the details about the flow, input, and output procedures as part of the display. Facility optimization server 140 may also display other details about a facility, such as retail space, the number of employees, or stock room space, as part of the detail display.

In response to the move of a re-locatable resource to a new facility (step 1325, Yes) in step 1330, facility optimization server 140 may determine whether there are any regulations, rules, laws, policies, or other restraints that prevent the resource relocation. If the move meets the restraints (step 1330, Yes), in step 1335, facility optimization server 140 may recalculate the affected capacities at the source and destination facilities. For example, if a delivery zone is relocated, facility optimization server 140 may recalculate the parking space availability, workroom space availability, and delivery route drive times. Then, returning to step 1030, facility optimization server 140 may re-create the geospatial display using the recalculated values. If the move does not meet the restraints (step 1330, No), in step 1340, facility optimization server 140 may warn the user through output device 240 that the move should not be made. For example a move of a delivery zone across a delivery district boundary may violate an internal regulation, moving a group of employees more than 20 miles from their current work location may violate a union contract, or increasing the average customer drive time or wait time beyond 10 minutes may violate an organizational policy. When this occurs, facility optimization server 140 may allow the warning to be overridden (step 1342) or it may prevent the move from occurring.

When work on a facility node study is finished (step 1345, Yes) in step 1350, facility optimization server 140 may save the work on the facility node study. If the study is final (step 1355, Yes) then facility optimization server 140 may create facility closure extract 155. Facility closure extract 155 may be stored in storage 220 or external storage, or sent to a recipient via an output device. The facility closure extract 155 may contain the information needed to prepare a final report proposing a facility closure, including the newly calculated impact on destination facility resources and capacities.

Figure 14:
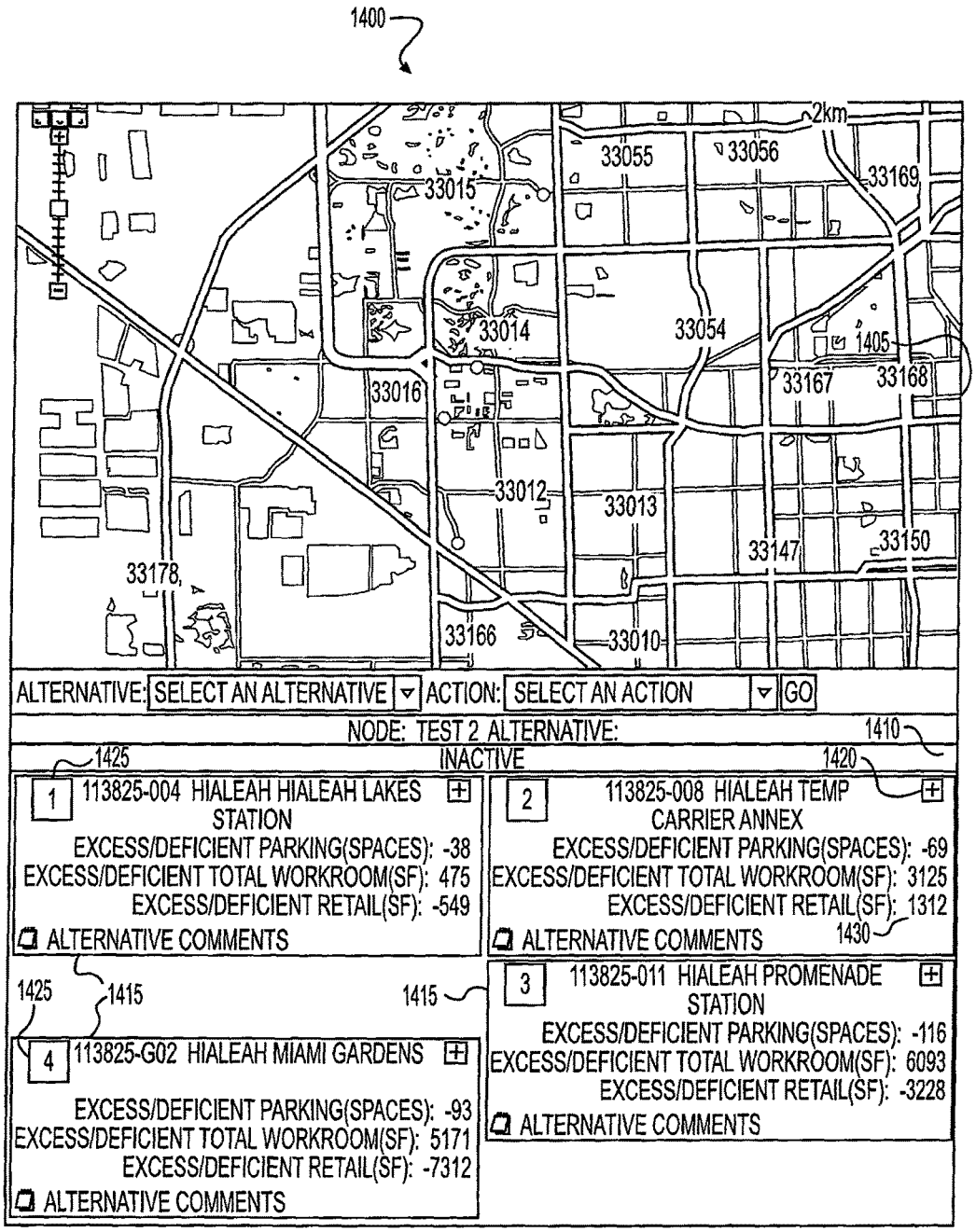
FIG. 14 is an exemplary display of candidates for a facility node study, consistent with disclosed embodiments.
Figure 15:
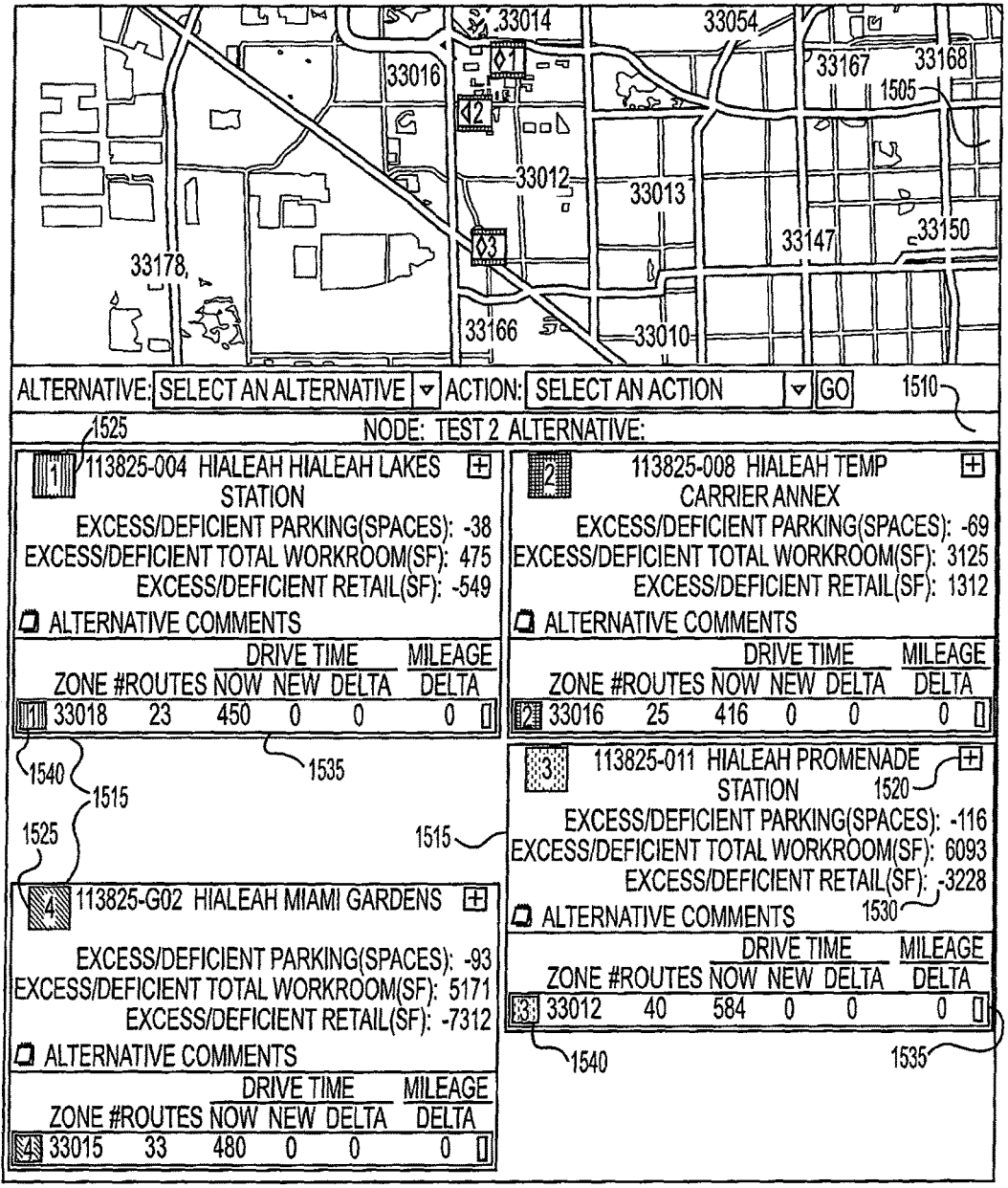
FIG. 15 is an exemplary display of facilities selected for a facility node study, consistent with disclosed embodiments.
Figure 16:
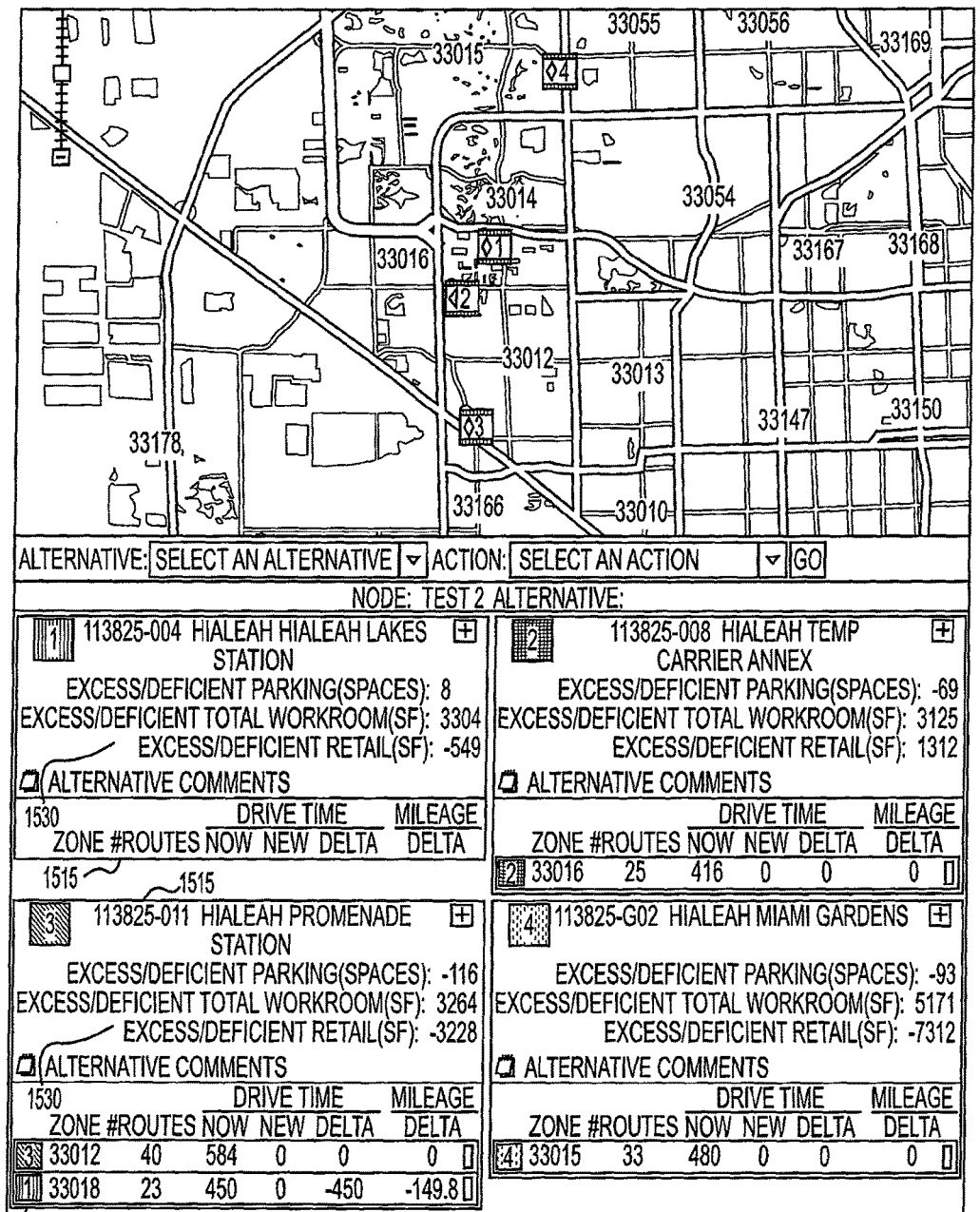
FIG. 16 is an exemplary display of relocating a facility resource in connection with a facility node study, consistent with disclosed embodiments.

An example of the operation of the node study function of facility optimization server 140 follows, using FIGS. 14-16. FIG. 14 is an exemplary display of candidates for a facility node study, consistent with disclosed embodiments. Candidates are chosen from the selected facilities at the time a user selects the option to create a alternative, or a facility node study, as shown in FIG. 12. Facility optimization server 140 saves the candidate facilities as part of the study, and displays them in inactive area 1410 of display 1400. Facility optimization server 140 may also display the location of each facility on map area 1405 as either a facility icon 700 or a simple circle icon. Facilities in inactive area 1410 may be candidates for a facility node study, but are not part of an active facility node study until they are selected, for example in response to selection of icon 1420. Facility detail box 1415 may contain a facility identifier 1425, a facility selection icon 1420, or resource statistic details 1430. In some embodiments resource statistic details 1430 may include the excess/deficient parking, workroom space, and retail space. Other embodiments may include resource statistic details for stock room space, square foot per machine, or work stations per employee.

FIG. 15 is an exemplary display of facilities selected for a facility node study, consistent with disclosed embodiments. In response to selection of icon 1420, facility optimization server 140 may move the facility to active area 1510 of display 1500. Facility optimization server 140 may display the location of each facility as a facility icon 700 in map area 1505. Facility optimization server 140 may create facility detail box 1515. Facility detail box 1515 may contain facility identifier 1525, which may be colored or shaded. Facility detail box 1515 may also contain a facility selection icon 1520, which may move the facility back to inactive area 1410, and facility resource statistic details 1530. Facility resource statistic details 1530 may be similar to facility resource statistic details 1430, or may contain additional details.

Additionally, facility detail box 1515 may contain information regarding re-locatable resources 1535. One example of a re-locatable resource is a delivery zone with one or more delivery routes, as shown in FIG. 15. Other examples may include a group of employees, portable machinery or equipment, or a pick-up route. Re-locatable resource information 1535 may include resource identifier 1540 that corresponds to facility identifier 1525. Facility optimization server 140 may color, shade, or mark both identifiers in the same manner so that the source facility of a re-locatable resource may be easily ascertained. In addition, re-locatable resource information 1535 may be the object of a 'drag-and-drop' operation, moving it from one facility to another. Re-locatable resource information 1535 for a delivery route may also include the current delivery route drive time, the amount of time a re-located delivery route takes, the change in drive time based on the relocation, or the increase or decrease in transportation costs resulting from the relocation.

FIG. 16 is an exemplary display of relocating a facility resource in connection with a facility node study, consistent with disclosed embodiments. In FIG. 16, a delivery zone has been moved from facility 1 to facility 3. As a result of this move, facility optimization server 140 may re-calculate facility resource statistic details 1530 for facilities 1 and 3, as shown by the differences in detail box 1515 for facility 1 and 3 in FIGS. 15 and 16. This instantly conveys the impact the move may have on destination facility 3. In addition, facility optimization server 140 may update the facility icon of facilities 1 and 3 to reflect the impact of the move on the resource categories. The move shows that facility 3 still has excess workroom space, but has become even more deficient in parking and retail space. In addition to recalculating facility resource statistic details 1530, facility optimization server 140 also may recalculate attributes associated with the moved resource. For example, the drive time for the delivery routes may be recalculated based on a departure from the new facility, and a transportation cost difference may be calculated based on the mileage of the new and old route. These attributes may be shown as part of re-locatable resource information 1535.

If facility 3 is not a good candidate for the move, the resource from facility 1 may be moved from facility 3 to facility 2. This may cause facility optimization server 140 to recalculate the facility resource statistic details 1530 and facility icons 700 for facilities 2 and 3 and the attributes associated with the moved resource. Facility optimization server 140 may then update the display with the recalculated data. The updated display instantly conveys the impact of the move on facility 2. In this manner some embodiments provide information to enable faster and more informed decisions regarding whether it is feasible to close a facility, and if feasible, how to most efficiently disburse facility resources.

The facility optimization server 140 may delete or inactivate the facility node study, stored in memory 220, external storage, or in a database accessed via network 175. Facility optimization server 140 may also give a facility node study an expiration date, so that if no action is taken on the study facility optimization server 140 may automatically inactivate the study by a specified date. Facility optimization server 140 may also track whether a facility closure plan generated from a facility closure extract has been approved.

Figure 17:
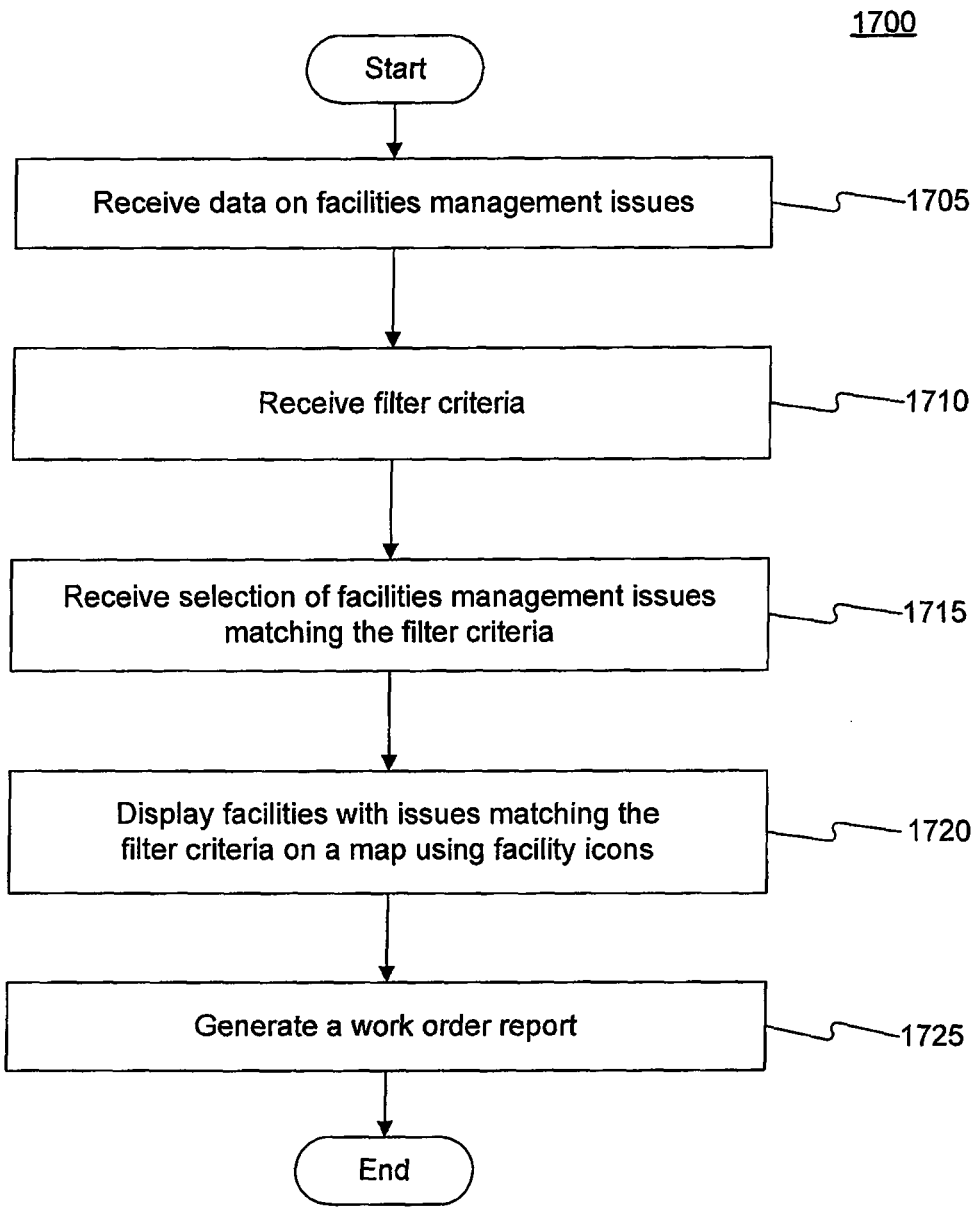
FIG. 17 is a flow diagram illustrating an exemplary facility maintenance issue identification process, consistent with disclosed embodiments.

FIG. 17 is a flow diagram illustrating an exemplary facility maintenance issue identification process, consistent with disclosed embodiments. In some embodiments, this process may be implemented according to facility optimization program 215. In an embodiment implemented using facility optimization server 140, as shown in FIG. 17, in step 1705, facility optimization server 140 may gather data from facility issues 110. Next, in step 1710, facility optimization server 140 may obtain facility filter criteria. Facility filter criteria may include items similar to those found in selection box 405 of FIG. 4. Facility filter criteria may also include the type of maintenance issues (such as a repair, general maintenance, or new construction) a cost estimate amount, an issue priority (such as urgent, emergency, or routine), or a maintenance issue category (such as electrical, mechanical, plumbing, painting, lighting, HVAC, paving, roofing, security, equipment, building structure, HVAC, signage, drainage, flooring, fencing, elevators, parking lot, accessibility, gutters, fire alarms, landscaping, transformers, etc.). In step 1715, facility optimization server 140 may use this criteria to select facilities with maintenance issues matching the filter criteria.

Once facility optimization server 140 has found matching maintenance issues, in step 1720 it may create a display of the facilities and the matching issues. The display may include a map area showing the location of each facility that has an associated matching issue. This allows a quick determination of whether there are any facilities in close proximity with similar issues. The display may also include a maintenance issue area with details on each maintenance issue. In step 1725, facility optimization server 140 may generate work order 145 in response to a request. Work order 145 may contain facility issues to be acted upon that day and the information needed to get the issues assigned to a repair or maintenance service.

An Alternative Embodiment for Retail Staffing

Embodiments may also include information obtained from a simulation based retail staffing model. In the staffing model, staffing profiles are created for each facility for each day of the year, thus accommodating the demographic, regional, and seasonal differences that impact the operations of each office. A simulation may be run to optimize the balance between customer wait time and resource utilization. Based on the results of the simulation, staffing profiles may be created based on retail sales data, such as transaction times, times between transactions (idle time), and the number of customers served during a specified time frame. An ideal staffing profile may be represented by the equation $-2.70+0.705$ Idle Time$+1.27$ Transaction Time$+0.103$ Number of Customers. Using historical retail sales data, the equation may be used to determine an optimal staffing model at a particular facility on a particular day.

To ensure that retail facilities comply with the staffing model, a compliance tool may monitor the retail facilities. The compliance tool may report the actual staffing at the facility as compared with the staffing suggested by the staffing model. The compliance tool may also calculate the cost of non-compliant staffing decisions. The difference between the actual staffing and the suggested staffing at a facility may represent a resource status and be displayed, for example, in area 705 of a facility icon. Additionally, the cost of non-compliance at a facility may represent another resource status.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in hardware alone. Additionally, although disclosed aspects are described as being stored in a memory on a computer, one skilled in the art will appreciate that these aspects can also be stored on other types of computer-readable media, such as secondary storage devices, like hard disks, floppy disks, a CD-ROM, or other forms of RAM or ROM. In addition, an implementation of software for disclosed aspects may use any variety of programming languages, such as Java, C, C++, JavaScript, or any other now known or later created programming language.

Other embodiments will be apparent to those skilled in the art from consideration of the specification and practice of the embodiments disclosed herein. It is intended that the specification and examples be considered as exemplary only, with the true scope and spirit being indicated by the following claims.

What is claimed is:

1. A computer-implemented method for facilities maintenance, the method comprising:
   receiving, from an electronic storage medium, data for a plurality of facilities, the data comprising: map data, location data, resource data, and competitor data;
   receiving a selection of one or more of the plurality of facilities;
   creating, using at least one processor, one or more facility icons based on the map data, location data, resource data, and competitor data, wherein each of the facility icons is associated with at least one of the selected facilities, each facility icon comprising:
      a plurality of geometric areas, wherein each geometric area represents a resource status corresponding to at least one facility resource; and
      a visual indicator corresponding to a numerical value or range of the resource status, wherein the visual indicator is associated with the geometric area representing the resource status, and the visual indicator comprises at least one of: a color coding scheme, a shading scheme, and a geometric pattern;
   creating map information for showing locations of the selected facilities on a map, wherein the locations are marked using the facility icons;
   displaying the facility icons on a display based on the map information;
   receiving a selection of at least one maintenance request related to the at least one facility resource;
   recalculating, using the at least one processor, the resource statuses of the selected facilities based on the selection;
   updating, using the at least one processor, the map information based on the recalculated resource statuses of the facility icons;
   updating, on the display, at least one of the plurality of geometric areas or the visual indicator associated with the facility icons based on the updated map information;
   identifying a subset of facilities associated with the at least one maintenance request from the selected facilities, wherein the distances between the subset of facilities are less than a threshold distance;
   generating a work order corresponding to the at least one maintenance request for the subset of facilities; and
   assigning the work order to a service provider.

2. The method of claim 1, further comprising receiving a request for additional data about at least one selected facility.

3. The method of claim 1, further comprising:
   creating information used to display a facility detail display area for at least one selected facility, the facility detail display area comprising:
      a facility identifier;
      a value for a resource category; and
      a desired value for the resource category.

4. The method of claim 3, wherein the desired value for the resource category represents a projected value.

5. The method of claim 3, wherein the desired value for the resource category represents a current need.

6. The method of claim 3, wherein the resource status is based on the difference between the value for the resource category and the desired value for the resource category.

7. The method of claim 1, wherein the facility icon further comprises a shape representing a facility type.

8. The method of claim 1, wherein the facility icon indicates the facility is part of an active facility node study.

9. The method of claim 1, further comprising displaying a three-dimensional image of the at least one selected facility at street level.

10. The method of claim 1, wherein the resource data comprises parking capacity, workroom capacity, or retail capacity.

11. The method of claim 1, wherein the work order comprises:
    a description of the maintenance issue; and
    an identifier of one of the subset of facilities associated with the maintenance issue.

12. A system for facilities maintenance, the system comprising:
    an electronic storage medium storing data for a plurality of facilities, the data comprising: map data, location data, resource data, and competitor data;
    a processor configured to:
       create, based on the map data, location data, resource data, and competitor data, one or more facility icons, wherein each of the facility icons is associated with one or more of the plurality of facilities, each facility icon comprising:
          a plurality of geometric areas, wherein each geometric area represents a resource status corresponding to at least one facility resource; and
          a visual indicator corresponding to a numerical value or range of the resource status, wherein the visual indicator is associated with the geometric area representing the resource status, and the visual indicator comprises at least one of:
             a color coding scheme, a shading scheme, and a geometric pattern;
       create map information for showing locations of the facilities on a map;
       display the facility icons based on the map information;
       receive an input regarding at least one maintenance request related to the at least one facility resource;
       recalculate the resource statuses of the facilities based on the input;
       update the map information with the recalculated resource statuses of the facility icons;
       identify a subset of facilities associated with the at least one maintenance request from the selected facilities, wherein the distances between the subset of facilities are less than a threshold distance;
       generate a work order corresponding to the at least one maintenance request for the subset of facilities; and
       assign the work order to a service provider; and
    a display device configured to:
       show a map including locations of the plurality of facilities, wherein the locations are marked using the facility icons; and
       update at least one of the plurality of geometric areas or the visual indicator associated with the facility icons based on the updated map information.

13. The system of claim 12, wherein the display device shows a facility detail display area for the first facility, the facility detail display area comprising:
- a facility identifier;
- a value for a resource category; and
- a desired value for the resource category.

14. The system of claim 13, wherein the desired value for the resource category represents a projected value.

15. The system of claim 13, wherein the desired value for the resource category represents a current need.

16. The system of claim 13, wherein the resource status is based on the difference between the value for the resource category and the desired value for the resource category.

17. The system of claim 12, wherein the facility icon indicates the facility is part of an active facility node study.

18. The system of claim 12, wherein the resource data comprises parking capacity, workroom capacity, or retail capacity.

19. The system of claim 12, wherein the work order comprises:
- a description of the maintenance issue; and
- an identifier of one of the plurality of facilities associated with the maintenance issue.

20. A non-transitory computer readable storage medium for creating a digital geospatial display of facilities, including one or more computer readable instructions and configured to cause one or more computer processors to perform operations, comprising:
- receiving data for a plurality of facilities, the data comprising: map data, location data, resource data, and competitor data;
- receiving a selection of one or more of the plurality of facilities;
- creating, based on the map data, location data, resource data, and competitor data, one or more facility icons, wherein each of the facility icons is associated with one or more of the plurality of facilities, each facility icon comprising:
  - a plurality of geometric areas, wherein each geometric area represents a resource status corresponding to at least one facility resource; and
  - a visual indicator corresponding to a numerical value or range of the resource status, wherein the visual indicator is associated with the geometric area representing the resource status, and the visual indicator comprises at least one of: a color coding scheme, a shading scheme, and a geometric pattern;
- creating map information for showing locations of the selected facilities on a map, wherein the locations are marked using the one or more facility icons;
- displaying the facility icons on a display based on the map information;
- receiving a selection of at least one maintenance request related to the at least one facility resource;
- recalculating the resource statuses of the selected facilities based on the selection;
- updating the map information based on the recalculated resource statuses of the facility icons;
- updating, on the display, at least one of the one or more geometric areas or the visual indicator associated with the facility icons based on the updated map information;
- identifying a subset of facilities associated with the at least one maintenance request from the selected facilities, wherein the distances between the subset of facilities are less than a threshold distance;
- generating a work order corresponding to the at least one maintenance request for the subset of facilities; and
- assigning the work order to a service provider.

21. The non-transitory computer readable storage medium of claim 20, the operations further comprising:
- receiving a request for additional data about at least one selected facility.

22. The non-transitory computer readable storage medium of claim 20, the operations further comprising:
- creating information used to display a facility detail display area for at least one selected facility comprising:
  - a facility identifier;
  - a value for a resource category; and
  - a desired value for the resource category.

23. The non-transitory computer readable storage medium of claim 22, wherein the desired value for the resource category represents a projected value.

24. The non-transitory computer readable storage medium of claim 22, wherein the desired value for the resource category represents a current need.

25. The non-transitory computer readable storage medium of claim 22, wherein the resource status is based on the difference between the value for the resource category and the desired value for the resource category.

26. The non-transitory computer readable storage medium of claim 20, wherein the facility icon further comprises a shape representing a facility type.

27. The non-transitory computer readable storage medium of claim 20, wherein the facility icon indicates the facility is part of an active facility node study.

28. The non-transitory computer readable storage medium of claim 20, the operations further comprising displaying a three-dimensional image of at least one selected facility at street level.

29. The non-transitory computer readable storage medium of claim 20, wherein the resource data comprises parking capacity, workroom capacity, or retail capacity.

30. A computer-implemented method for reallocating resources by creating a digital geospatial display of a plurality of facilities, comprising:
- retrieving, from an electronic storage medium, identifiers of the plurality of facilities;
- creating, using at least one processor, information used to display a map showing locations of the plurality of facilities using facility icons, each facility icon comprising a resource status based at least on a resource category comprising at least one of retail capacity, workroom capacity, and lease expense;
- displaying the facility icon on a display;
- receiving a reassignment of a re-locatable resource from a first facility to a second facility of the plurality of facilities;
- recalculating, using the at least one processor, the resource statuses of facility icons associated with the first facility and the second facility based on the reassignment;
- updating, using the at least one processor, the information used to display the map with the recalculated resource statuses of the facility icons;
- determining whether the reassignment of the re-locatable resource violates a restraint, wherein the restraint prevents reassignment of the re-locatable resource from the first facility to the second facility of the plurality of facilities;

displaying a warning message to a user when the reassignment of the re-locatable resource violates the restraint; and reallocating the re-locatable resource to the second facility when the reassignment does not violate the restraint.

31. The method of claim 30, further comprising:
creating an output that contains information on a facility node study, the output comprising:
data reflecting the reassignment of the re-locatable resource; and
the resource status of the first facility and the second facility after the reassignment of the re-locatable resource.

32. The method of claim 31, further comprising assigning an expiration date to the facility node study.

33. The method of claim 31, wherein the output is a report.

34. The method of claim 30, further comprising creating information to display an identifier for the re-locatable resource, wherein the identifier is capable of being moved through a drag-and-drop operation.

35. The method of claim 30, wherein the restraint comprises regulations, law, contract obligations, or policies.

36. A non-transitory computer readable storage medium for reallocating resources by creating a digital geospatial display of a plurality of facilities, including one or more computer readable instructions configured to cause one or more computer processors to perform operations comprising:
retrieving identifiers of the plurality of facilities;
creating information used to display a map showing locations of the plurality of facilities using facility icons, each facility icon comprising a resource status based at least on a resource category comprising at least one of retail capacity, workroom capacity, and lease expense;
displaying the facility icons on a display;
receiving a reassignment of a re-locatable resource from a first facility to a second facility of the plurality of facilities;
recalculating the resource statuses of facility icons associated with the first facility and the second facility based on the reassignment;
updating the information used to display the map with the recalculated resource statuses of the facility icons associated with the first facility and the second facility;
determining whether the reassignment of the re-locatable resource violates a restraint, wherein the restraint prevents reassignment of the re-locatable resource from the first facility to the second facility of the plurality of facilities;
display a warning message to a user when the reassignment of the re-locatable resource violates the restraint; and
reallocating the re-locatable resource to the second facility when the reassignment does not violate the restraint.

37. The non-transitory computer readable storage medium of claim 36, the operations further comprising:
creating an output that contains information on a facility node study, the output comprising:
data reflecting the reassignment of the re-locatable resource; and
the resource status of the first facility and the second facility after the reassignment of the re-locatable resource.

38. The non-transitory computer readable storage medium of claim 37, the operations further comprising assigning an expiration date to the facility node study.

39. The non-transitory computer readable storage medium of claim 37, wherein the output is a report.

40. The non-transitory computer readable storage medium of claim 36, the operations further comprising creating information used to display an identifier for the re-locatable resource, wherein the identifier is capable of being moved through a drag-and-drop operation.

41. The non-transitory computer readable storage medium of claim 36, wherein the restraint comprises regulations, law, contract obligations, or policies.

42. A system for reallocating resources by creating a digital geospatial display of a plurality of facilities, comprising:
a processor;
a memory coupled to the processor, the memory storing instructions to direct the processor to perform operations;
a display device coupled to the processor, the display having a map showing:
a location of a first facility of the plurality of facilities as a first facility icon, the first facility icon comprising a resource status of the first facility based at least on a resource category comprising at least one of retail capacity, workroom capacity, and lease expense; and
wherein the processor:
receives a reassignment of a re-locatable resource from the first facility to a second facility of the plurality of facilities;
recalculates the resource statuses of the first facility icon and a second facility icon based on the reassignment, the second facility icon comprising a resource status of the second facility based at least on the resource category;
updates the map with the recalculated resource statuses of the first facility icon and the second facility icon;
determines whether the reassignment of the re-locatable resource violates a restraint, wherein the restraint prevents reassignment of the re-locatable resource from the first facility to the second facility of the plurality of facilities;
display a warning message to a user when the reassignment of the re-locatable resource violates the restraint; and
reallocates the re-locatable resource to the second facility when the reassignment does not violate the restraint.

43. The system of claim 42, wherein the processor creates an output that contains information on a facility node study, the output comprising:
data reflecting the reassignment of the re-locatable resource; and
the resource status of the first facility and the second facility after the reassignment of the re-locatable resource.

44. The system of claim 43, wherein the processor assigns an expiration date to the facility node study.

45. The system of claim 43, wherein the output is a report.

46. The system of claim 42, wherein the restraint comprises regulations, law, contract obligations, or policies.

47. The method of claim 3, wherein the desired value for the resource category represents an optimum level for a facility resource.

48. The method of claim 6, wherein the resource status corresponds to a status comprising one of: deficient, adequate, and excess.

49. The system of claim 13, wherein the desired value for the resource category represents an optimum level for a facility resource.

50. The system of claim 16, wherein the resource status corresponds to a status comprising one of: deficient, adequate, and excess.

51. The non-transitory computer readable storage medium of claim 22, wherein the desired value for the resource category represents an optimum level for a facility resource.

52. The non-transitory computer readable storage medium of claim 25, wherein the resource status corresponds to a status comprising one of: deficient, adequate, and excess.

53. The method of claim 30, wherein the restraint comprises at least one of: an internal regulation, a union contract, and an organizational policy.

54. The non-transitory computer readable storage medium of claim 36, wherein the restraint comprises at least one of: an internal regulation, a union contract, and an organizational policy.

55. The system of claim 42, wherein the restraint comprises at least one of: an internal regulation, a union contract, and an organizational policy.

56. The method of claim 1, wherein the resource status corresponds to at least one projected future facility resource.

57. The method of claim 30, further comprising preventing the reassignment of the re-locatable resource that violates the restraint.

* * * * *